United States Patent
Barbieri et al.

(10) Patent No.: US 9,515,773 B2
(45) Date of Patent: Dec. 6, 2016

(54) CHANNEL STATE INFORMATION REPORTING IN A WIRELESS COMMUNICATION NETWORK

(75) Inventors: Alan Barbieri, San Diego, CA (US); Tingfang Ji, San Diego, CA (US); Hao Xu, San Diego, CA (US); Tao Luo, San Diego, CA (US); Durga Prasad Malladi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 365 days.

(21) Appl. No.: 13/084,959

(22) Filed: Apr. 12, 2011

(65) Prior Publication Data

US 2011/0249643 A1    Oct. 13, 2011

Related U.S. Application Data

(60) Provisional application No. 61/323,829, filed on Apr. 13, 2010.

(51) Int. Cl.
| | | |
|---|---|---|
| *H04L 1/00* | (2006.01) | |
| *H04W 24/10* | (2009.01) | |
| *H04W 72/04* | (2009.01) | |

(52) U.S. Cl.
CPC .......... *H04L 1/0026* (2013.01); *H04L 1/0028* (2013.01); *H04W 24/10* (2013.01); *H04W 72/0413* (2013.01)

(58) Field of Classification Search
CPC .. H04L 1/0026; H04L 1/0028; H04W 24/10; H04W 72/042; H04W 72/0413
See application file for complete search history.

(56) References Cited

U.S. PATENT DOCUMENTS

| | | |
|---|---|---|
| 5,936,979 A | 8/1999 | Jyrkka |
| 6,574,456 B2 | 6/2003 | Hamabe |
| 6,839,333 B1 | 1/2005 | Åkerberg |
| 6,907,270 B1 | 6/2005 | Blanz |
| 6,973,098 B1 | 12/2005 | Lundby et al. |
| 7,031,753 B2 | 4/2006 | Hashem et al. |
| 7,283,510 B2 | 10/2007 | Ito et al. |

(Continued)

FOREIGN PATENT DOCUMENTS

| | | |
|---|---|---|
| CN | 1438781 A | 8/2003 |
| CN | 1708923 A | 12/2005 |

(Continued)

OTHER PUBLICATIONS

"3rd Generation Partnership Project; Technical Specification Group Radio Access Network; Evolved Universal Terrestrial Radio Access (E-UTRA) ; Physical layer procedures (Release 9)", 3GPP Standard; 3GPP TS 36.213, 3rd Generation Partnership Project (3GPP), Mobile Competence Centre ; 650, Route Des Lucioles ; F-06921 Sophia-Antipolis Cedex ; France, No. V9.3.0, Sep. 17, 2010 (Sep. 17, 2010), pp. 1-80, XP050442094, [retrieved on Sep. 17, 2010].

(Continued)

*Primary Examiner* — Chirag Shah
*Assistant Examiner* — Srinivasa Reddivalam
(74) *Attorney, Agent, or Firm* — Nerrie M. Zohn

(57) ABSTRACT

According to certain aspects, techniques for periodically reporting channel state information (CSI) on protected and unprotected resources are provided. The protected resources may include resources in which transmissions in a first cell are protected by restricting transmissions in a second cell.

40 Claims, 9 Drawing Sheets

(56) References Cited

U.S. PATENT DOCUMENTS

| | | |
|---|---|---|
| 7,428,269 B2 | 9/2008 | Sampath et al. |
| 7,738,907 B2 | 6/2010 | Xiao et al. |
| 7,742,444 B2 | 6/2010 | Mese et al. |
| 7,813,311 B2 | 10/2010 | Dick et al. |
| 7,860,198 B2 | 12/2010 | Montalbano |
| 7,907,572 B2 | 3/2011 | Yang et al. |
| 7,944,983 B2 | 5/2011 | Fu et al. |
| 8,068,785 B2 | 11/2011 | Ahn et al. |
| 8,085,875 B2 | 12/2011 | Gore et al. |
| 8,102,935 B2 | 1/2012 | Akkarakaran et al. |
| 8,107,885 B2 | 1/2012 | Love et al. |
| 8,121,602 B2 | 2/2012 | Yi et al. |
| 8,130,849 B2 | 3/2012 | Lincoln et al. |
| 8,254,911 B1 | 8/2012 | Lee |
| 8,270,547 B2 | 9/2012 | Panicker et al. |
| 8,275,408 B2 | 9/2012 | Attar et al. |
| 8,305,921 B2 | 11/2012 | Narasimhan et al. |
| 8,385,477 B2 | 2/2013 | Cedergren et al. |
| 8,477,603 B2 | 7/2013 | Sambhwani et al. |
| 8,493,942 B2 | 7/2013 | Luo et al. |
| 8,605,771 B2 | 12/2013 | Cairns |
| 8,611,295 B2 | 12/2013 | Song et al. |
| 8,654,701 B2* | 2/2014 | Kazmi et al. .............. 370/318 |
| 2001/0007819 A1 | 7/2001 | Kubota |
| 2002/0188723 A1 | 12/2002 | Choi et al. |
| 2003/0016740 A1 | 1/2003 | Jeske et al. |
| 2003/0125040 A1 | 7/2003 | Walton et al. |
| 2004/0072579 A1 | 4/2004 | Hottinen |
| 2005/0207367 A1* | 9/2005 | Onggosanusi ........ H04L 1/0003 |
| | | 370/315 |
| 2006/0121946 A1 | 6/2006 | Walton et al. |
| 2007/0036179 A1 | 2/2007 | Palanki et al. |
| 2007/0064655 A1 | 3/2007 | Ruuska |
| 2007/0081480 A1 | 4/2007 | Cai et al. |
| 2007/0098098 A1 | 5/2007 | Xiao et al. |
| 2007/0109989 A1 | 5/2007 | Nakagawa et al. |
| 2007/0191015 A1 | 8/2007 | Hwang et al. |
| 2007/0197251 A1 | 8/2007 | Das et al. |
| 2007/0232238 A1 | 10/2007 | Kawasaki |
| 2007/0293234 A1 | 12/2007 | Kim et al. |
| 2008/0014958 A1 | 1/2008 | Kim et al. |
| 2008/0051087 A1 | 2/2008 | Ryu et al. |
| 2008/0089281 A1* | 4/2008 | Yoon ................ H04W 72/042 |
| | | 370/329 |
| 2008/0123547 A1 | 5/2008 | Palanki |
| 2008/0233967 A1 | 9/2008 | Montojo et al. |
| 2008/0261645 A1 | 10/2008 | Luo et al. |
| 2009/0046667 A1* | 2/2009 | Pelletier ............. H04W 52/286 |
| | | 370/335 |
| 2009/0135754 A1 | 5/2009 | Yavuz et al. |
| 2009/0161781 A1 | 6/2009 | Kolze |
| 2009/0170442 A1 | 7/2009 | Asanuma et al. |
| 2009/0199055 A1* | 8/2009 | Chen ................ H03M 13/356 |
| | | 714/701 |
| 2009/0201825 A1 | 8/2009 | Shen et al. |
| 2009/0238256 A1* | 9/2009 | Onggosanusi et al. ....... 375/228 |
| 2009/0245170 A1* | 10/2009 | Zhang ................ H04L 5/0053 |
| | | 370/328 |
| 2009/0247181 A1 | 10/2009 | Palanki et al. |
| 2009/0252077 A1 | 10/2009 | Khandekar et al. |
| 2009/0257390 A1 | 10/2009 | Ji et al. |
| 2009/0316809 A1 | 12/2009 | Chun et al. |
| 2009/0323616 A1 | 12/2009 | Zeller et al. |
| 2010/0002664 A1 | 1/2010 | Pan et al. |
| 2010/0008282 A1 | 1/2010 | Bhattad et al. |
| 2010/0035555 A1 | 2/2010 | Bala et al. |
| 2010/0039970 A1 | 2/2010 | Papasakellariou et al. |
| 2010/0040005 A1* | 2/2010 | Kim ................ H04J 11/0069 |
| | | 370/329 |
| 2010/0041390 A1 | 2/2010 | Chen et al. |
| 2010/0048151 A1 | 2/2010 | Hara |
| 2010/0067366 A1 | 3/2010 | Nicoli et al. |
| 2010/0098012 A1 | 4/2010 | Bala et al. |
| 2010/0106828 A1 | 4/2010 | Palanki et al. |
| 2010/0111235 A1 | 5/2010 | Zeng et al. |
| 2010/0182903 A1 | 7/2010 | Palanki et al. |
| 2010/0195582 A1 | 8/2010 | Koskinen |
| 2010/0195604 A1* | 8/2010 | Papasakellariou et al. .. 370/329 |
| 2010/0202311 A1 | 8/2010 | Lunttila et al. |
| 2010/0202372 A1* | 8/2010 | Chun et al. ................... 370/329 |
| 2010/0214937 A1 | 8/2010 | Chen et al. |
| 2010/0215075 A1 | 8/2010 | Jonsson et al. |
| 2010/0216405 A1 | 8/2010 | Bhadra et al. |
| 2010/0222062 A1 | 9/2010 | Chou et al. |
| 2010/0226327 A1 | 9/2010 | Zhang et al. |
| 2010/0227638 A1 | 9/2010 | Park et al. |
| 2010/0272077 A1 | 10/2010 | Van Rensburg et al. |
| 2010/0278109 A1* | 11/2010 | Papasakellariou .... H04L 5/0037 |
| | | 370/328 |
| 2010/0278290 A1 | 11/2010 | Huang et al. |
| 2011/0013710 A1* | 1/2011 | Xiao ............................. 375/260 |
| 2011/0019637 A1* | 1/2011 | Ojala .................... H04L 1/0026 |
| | | 370/329 |
| 2011/0032839 A1* | 2/2011 | Chen et al. ................... 370/252 |
| 2011/0041021 A1* | 2/2011 | Khoshnevis .......... H04L 1/1819 |
| | | 714/748 |
| 2011/0081917 A1 | 4/2011 | Frank et al. |
| 2011/0092231 A1 | 4/2011 | Yoo et al. |
| 2011/0105164 A1 | 5/2011 | Lim et al. |
| 2011/0105171 A1 | 5/2011 | Luschi et al. |
| 2011/0142003 A1 | 6/2011 | Kuchi et al. |
| 2011/0158211 A1 | 6/2011 | Gaal et al. |
| 2011/0170514 A1* | 7/2011 | Eriksson et al. .............. 370/329 |
| 2011/0177821 A1 | 7/2011 | Senarath et al. |
| 2011/0206167 A1 | 8/2011 | Rosenqvist et al. |
| 2011/0211503 A1 | 9/2011 | Che et al. |
| 2011/0250919 A1 | 10/2011 | Barbieri et al. |
| 2011/0275394 A1 | 11/2011 | Song et al. |
| 2011/0312319 A1 | 12/2011 | Lindoff et al. |
| 2011/0312358 A1 | 12/2011 | Barbieri et al. |
| 2011/0317624 A1 | 12/2011 | Luo et al. |
| 2012/0003945 A1* | 1/2012 | Liu et al. .................... 455/115.1 |
| 2012/0009959 A1 | 1/2012 | Yamada et al. |
| 2012/0044818 A1 | 2/2012 | Lindoff et al. |
| 2012/0063386 A1 | 3/2012 | Park et al. |
| 2012/0076025 A1 | 3/2012 | Barbieri et al. |
| 2012/0076040 A1 | 3/2012 | Hoshino et al. |
| 2012/0082197 A1 | 4/2012 | Jonsson et al. |
| 2012/0092989 A1* | 4/2012 | Baldemair et al. ........... 370/230 |
| 2012/0113851 A1* | 5/2012 | Schober et al. .............. 370/252 |
| 2012/0190391 A1 | 7/2012 | Yoo et al. |
| 2012/0201152 A1 | 8/2012 | Yoo et al. |
| 2012/0263247 A1 | 10/2012 | Bhattad et al. |
| 2012/0270535 A1* | 10/2012 | Chen ..................... H04W 24/10 |
| | | 455/422.1 |
| 2012/0327795 A1 | 12/2012 | Mallik et al. |
| 2012/0329498 A1* | 12/2012 | Koo et al. ...................... 455/501 |
| 2013/0039203 A1* | 2/2013 | Fong ...................... H04B 7/024 |
| | | 370/252 |
| 2013/0157675 A1 | 6/2013 | Li et al. |
| 2013/0301458 A1 | 11/2013 | Barbieri et al. |
| 2014/0348019 A1 | 11/2014 | Barbieri et al. |

FOREIGN PATENT DOCUMENTS

| | | |
|---|---|---|
| CN | 1943158 A | 4/2007 |
| EP | 1337054 A2 | 8/2003 |
| EP | 1735938 A1 | 12/2006 |
| JP | 2007189619 A | 7/2007 |
| JP | 3973017 B2 | 9/2007 |
| JP | 2010016494 A | 1/2010 |
| JP | 2013534778 A | 9/2013 |
| KR | 20080046404 A | 5/2008 |
| RU | 2211535 C2 | 8/2003 |
| RU | 2351069 C2 | 3/2009 |
| WO | 03041300 A1 | 5/2003 |
| WO | 2005089004 A1 | 9/2005 |
| WO | 2005099163 A1 | 10/2005 |
| WO | 2006020021 A1 | 2/2006 |
| WO | WO-2006099546 A1 | 9/2006 |
| WO | 2008082118 A1 | 7/2008 |
| WO | 2008118810 A1 | 10/2008 |
| WO | WO-2009023730 | 2/2009 |
| WO | 2009057960 A2 | 5/2009 |

(56) References Cited

FOREIGN PATENT DOCUMENTS

| WO | 2009065075 A1 | 5/2009 |
|---|---|---|
| WO | 2009099811 A1 | 8/2009 |
| WO | 2009118707 A1 | 10/2009 |
| WO | 2009119988 A1 | 10/2009 |
| WO | 2009120934 A1 | 10/2009 |
| WO | WO-2009120465 A2 | 10/2009 |
| WO | 2010002230 A2 | 1/2010 |
| WO | 2010025270 A1 | 3/2010 |
| WO | 2010056763 A2 | 5/2010 |
| WO | 2010058979 A2 | 5/2010 |
| WO | 2010074444 A2 | 7/2010 |
| WO | 2010083451 A2 | 7/2010 |
| WO | 2010089408 A1 | 8/2010 |
| WO | 2010103886 A1 | 9/2010 |
| WO | 2011002389 A1 | 1/2011 |
| WO | 2011130447 A1 | 10/2011 |
| WO | 2011163265 A1 | 12/2011 |
| WO | 2011163482 A1 | 12/2011 |

OTHER PUBLICATIONS

CATT: "Considerations on Interference Coordination in Het-Net", 3GPP Draft; R1-100902, 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418504, [retrieved on Feb. 16, 2010].

CMCC: "Discussion on HeNB related interference scenarios and deployment configurations" , 3GPP Draft; R4-091232, 3rd Generation Partnership Project (3GPP), Mobile Competence Centre ; 650, Route Des Lucioles ; F-06921 Sophia-Antipolis Cedex ; France, No. Seoul, Korea; Mar. 30, 2009, Mar. 30, 2009 (Mar. 30, 2009), XP050342009, [retrieved on Mar. 30, 2009] the whole document.

Duplicy, J. et al. (Mar. 8, 2011) "MU-MIMO in LTE Systems," EURASIP Journal on Wireless Communications and Networking, Hindawi Publishing Corporation, vol. 2011, Article ID 496763, pp. 1-13, doi: 10.1155/2011/496763.

Hsieh M-H. et al: "Channel Estimation for OFDM Systems Based on Comb-type Pilot Arrangement in Frequency Selective Fading Channels" IEEE Transactions on Consumer Electronics, vol. '44, No. 1, Feb. 1, 1998, pp. 217-225.

Huawei: "Correction on CQI reporting", 3GPP Draft; R1-091652 36.213 CR238(REL-8,F) Correction on CQI Reporting, 3rd Generation Partnership Project (3GPP), Mobile Competence Centre ; 650, Route Des Lucioles ; F-06921 Sophia Antipolis Cedex ; France, No. Seoul, Korea; Mar. 28, 2009, Mar. 28, 2009 (Mar. 28, 2009), XP050339187, [retrieved on Mar. 28, 2009].

Huawei: "CQI Enhancement for Interference Varying Environments", 3GPP Draft; R1-101061 CQI Enhancement for Interference Varying Environments VER (Final), 3rd Generation Partnership Project (3GPP), Mobile Competence Centre ; 650, Route Des Lucioles ; F-06921 Sophia-Antipolis Cedex ; France, vol. RAN WGI, No. San Francisco, USA; Feb. 22, 2010, Feb. 16, 2010 (Feb. 16, 2010), XP050418632, [retrieved on Feb. 16, 2010].

Huawei: "Enhanced ICIC and Resource-Specific CQI Measurement", 3GPP Draft; R1-101981, 3rd Generation Partnership Project (3GPP), Mobile Competence Centre ; 650, Route Des Lucioles ; F-06921 Sophia-Antipolis Cedex ; France, vol. RAN WGI, No. Beijing, china; Apr. 12, 2010, Apr. 6, 2010 (Apr. 6, 2010), XP050419318, [retrieved on Apr. 6, 2010].

International Search Report and Written Opinion—PCT/US2011/032297, ISA/EPO—Jul. 8, 2011.

NTT DOCOMO: "Interference Coordination for Non-CA-based Heterogeneous Networks", 3GPP Draft; R1-102307 ICIC for Non-CA Hetnet, 3rd Generation Partnership Project (3GPP), Mobile Competence Centre ; 650, Route Des Lucioles ; F-06921 Sophia-Antipolis Cedex ; France, vol. RAN WG1, No. Beijing, china; Apr. 12, 2010, Apr. 7, 2010 (Apr. 7, 2010), XP050419698, [retrieved on Apr. 7, 2010].

Philips: "CQI/PMI reference measurement periods", 3GPP Draft; R1-082528, 3rd Generation Partnership Project (3GPP), Mobile Competence Centre ; 650, Route Des Lucioles ; F-06921 Sophia-Antipolis Cedex ; France, vol. RAN WGI, No. Warsaw, Poland; Jun. 25, 2008, Jun. 25, 2008 (Jun. 25, 2008), XP050110793, [retrieved on Jun. 25, 2008].

Sawahashi M., et al., "Coordinated multi point transmission/reception techniques for LTE-advanced [Coordinated and Distributed MIMO]" IEEE Wireless Communications, IEEE Service Center, Piscataway, NJ, US, vol. 17, No. 3, Jun. 1, 2010 (Jun. 1, 2010), pp. 26-34, XP011311805, ISSN: 1536-1284 p. 30, paragraph Uplink.

Intel Corporation (UK) Ltd, "Non-CA based PDCCH Interference Mitigation in LTE-A", 3GPP TSG RAN WG1 Meeting #61 R1-102814 Montreal, Canada, May 10-14, 2010.

QUALCOMM Incorporated, "Enabling communication in harsh interference scenarios", 3GPP TSG-RAN WG1 #62bis R1-105693 Oct. 11-Oct. 15, 2010 Xian, China.

Research in Motion et al: "On Downlink Single Cell MU-MIMO in LTE-A", 3GPP Draft; R1-094458(RIM-downlink Single Cell MU-MIMO in LTE-A), 3rd Generation Partnership Project (3GPP), Mobile Competence Centre ; 650, Route Des Lucioles ; F-06921 Sophia-Antipolis Cedex ; France, No. Jeju; Nov. 9, 2009, Nov. 9, 2009 (Nov. 9, 2009), XP050388884, [retrieved on Nov. 3, 2009] p. 3.

Research in Motion, UK Limited, "On Downlink Single Cell MU-MIMO in LTE-A", 3GPP TSG RAN WG1 Meeting #59bis R1-100562, Valencia, Spain, Jan. 18-22, 2010.

CATT: "Analysis of Time-Partitioning Solution for Control Channel", 3GPP TSG RAN WG1 meeting #61bis, R1-103494, Dresden, Germany, Jun. 28-Jul. 2, 2010, pp. 1-3.

HUAWEI: "Enhanced ICIC and Resource-Specific CQI Measurement", 3GPP TSG RAN WG1 meeting #61bis, R1-103900, Dresden, Germany, Jun. 28-Jul. 2, 2010, pp. 1-6.

Khandekar A., "LTE-Advanced: Heterogeneous networks", Wireless Conference (EW), 2010 European, Apr. 12-15, 2010, pp. 978-982.

LG Electronics, "Extending Rel-819 ICIC for heterogeneous network", 3GPP TSG RAN WG1 Meeting #60bis, R1-102430, Apr. 12-16, 2010, 4 pages.

Nishio A, et al., "Adaptive Transmission Techniques for Control Signaling in 3G-LTE," Panasonic Technical Journal, vol. 55, No. 1, Apr. 2009, pp. 15-20.

QUALCOMM Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre ; 650, Route Des Lucioles ; F-06921 Sophia-Anti Polis Cedex ; France, vol. RAN WG1, No. Dresden, Germany; Jun. 28, 2010, Jun. 28-Jul. 2, 2010 (Jun. 22, 2010), XP050449060, pp. 1-5.

Samsung: Static/Dynamic Home eNB ICIC function, 3GPP TSG RAN WG1 #61bis R1-103683, Jun. 24, 2010.

* cited by examiner

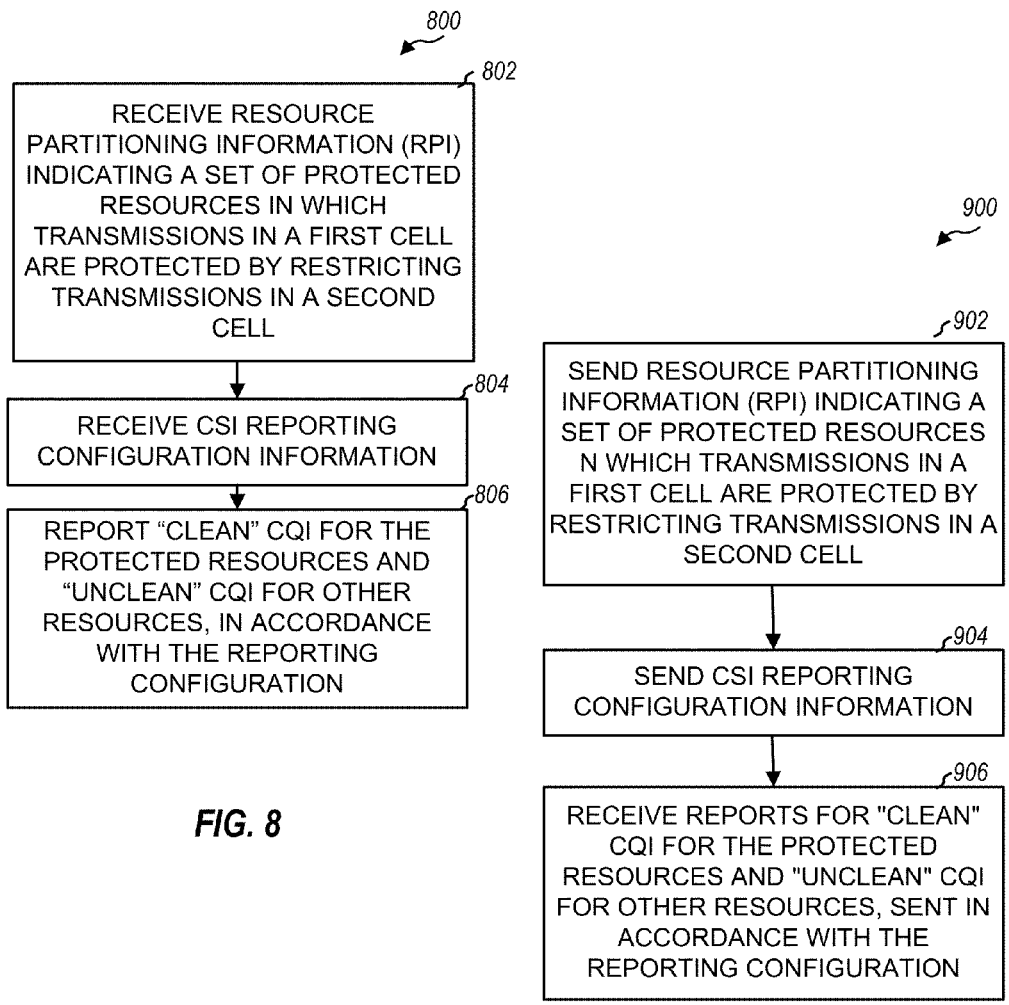

CHANNEL STATE INFORMATION REPORTING IN A WIRELESS COMMUNICATION NETWORK

CROSS-REFERENCE TO RELATED APPLICATIONS

This application claims priority to U.S. Provisional Application Ser. No. 61/323,829, entitled, "PERIODIC CQI REPORTING IN A WIRELESS COMMUNICATION NETWORK", and filed on Apr. 13, 2010, which is expressly incorporated by reference herein in its entirety.

BACKGROUND

I. Field

The present disclosure relates generally to communication, and more specifically to techniques for reporting channel state information (CSI) in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

SUMMARY

Certain aspects of the present disclosure provide a method for wireless communication. The method generally includes periodically reporting channel state information (CSI) for a first set of resources in which transmissions in a first cell are protected by restricting transmissions in a second cell and periodically reporting CSI for a second set of resources.

Certain aspects of the present disclosure provide a method for wireless communication. The method generally includes receiving periodically reported channel state information (CSI) for a first set of resources in which transmissions in a first cell are protected by restricting transmissions in a second cell and receiving periodically reported CSI for a second set of resources.

Certain aspects of the present disclosure provide an apparatus for wireless communication. The apparatus generally includes means for periodically reporting channel state information (CSI) for a first set of resources in which transmissions in a first cell are protected by restricting transmissions in a second cell and means for periodically reporting CSI for a second set of resources.

Certain aspects of the present disclosure provide an apparatus for wireless communication. The apparatus generally includes means for receiving periodically reported channel state information (CSI) for a first set of resources in which transmissions in a first cell are protected by restricting transmissions in a second cell and means for receiving periodically reported CSI for a second set of resources.

Certain aspects of the present disclosure provide an apparatus for wireless communication. The apparatus generally includes at least one processor configured to periodically report channel state information (CSI) for a first set of resources in which transmissions in a first cell are protected by restricting transmissions in a second cell and to periodically report CSI for a second set of resources; and a memory coupled with the at least one processor.

Certain aspects of the present disclosure provide an apparatus for wireless communication. The apparatus generally includes at least one processor configured to receive periodically reported channel state information (CSI) for a first set of resources in which transmissions in a first cell are protected by restricting transmissions in a second cell and to receive periodically reported CSI for a second set of resources; and a memory coupled with the at least one processor.

A computer program product comprising a computer readable medium with instructions stored thereon, the instructions executable by one or more processors for reporting channel state information (CSI) for a first set of resources in which transmissions in a first cell are protected by restricting transmissions in a second cell and periodically reporting CSI for a second set of resources.

A computer program product comprising a computer readable medium with instructions stored thereon, the instructions executable by one or more processors for receiving periodically reported channel state information (CSI) for a first set of resources in which transmissions in a first cell are protected by restricting transmissions in a second cell and receiving periodically reported CSI for a second set of resources.

BRIEF DESCRIPTION OF THE DRAWINGS

FIG. 8 illustrates example operations that may be performed by a UE, in accordance with certain aspects of the present disclosure.

FIG. 9 illustrates example operations that may be performed by a BS, in accordance with certain aspects of the present disclosure.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA), Time Division Synchronous CDMA (TD-SCDMA), and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A), in both frequency division duplexing (FDD) and time division duplexing (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
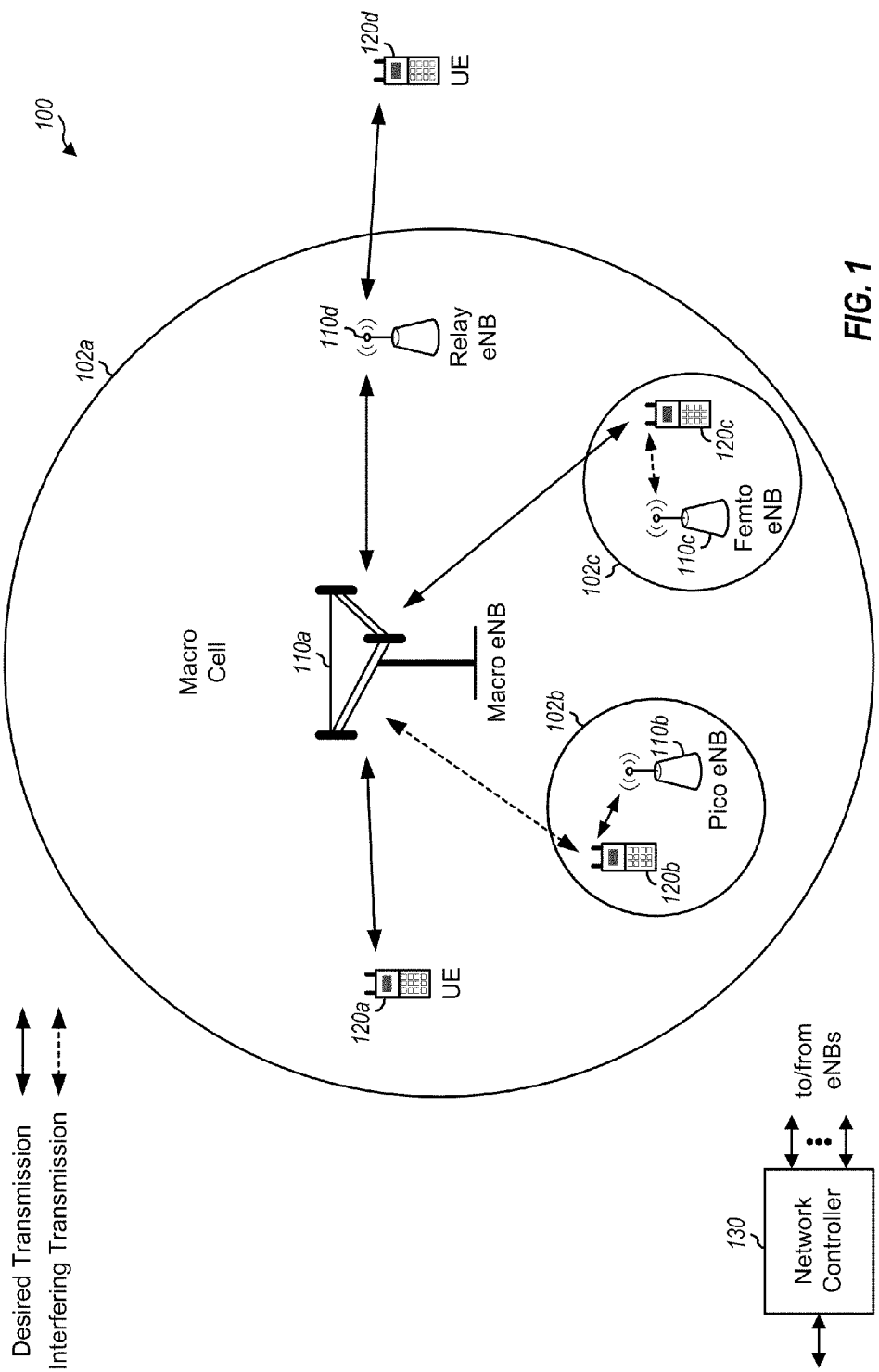
FIG. 1 shows a wireless communication network.

FIG. 1 shows a wireless communication network 100, which may be an LTE network or some other wireless network. Wireless network 100 may include a number of evolved Node Bs (eNBs) 110 and other network entities. An eNB is an entity that communicates with UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, an eNB 110a may be a macro eNB for a macro cell 102a, an eNB 110b may be a pico eNB for a pico cell 102b, and an eNB 110c may be a femto eNB for a femto cell 102c. An eNB may support one or multiple (e.g., three) cells. The terms "eNB" and "base station" are used interchangeably herein.

Wireless network 100 may also include relay stations. A relay station is an entity that can receive a transmission of data from an upstream station (e.g., an eNB or a UE) and send a transmission of the data to a downstream station (e.g., a UE or an eNB). A relay station may also be a UE that can relay transmissions for other UEs. In the example shown in FIG. 1, a relay station 110d may communicate with macro eNB 110a and a UE 120d in order to facilitate communication between eNB 110a and UE 120d. A relay station may also be referred to as a relay eNB, a relay base station, a relay, etc.

Wireless network 100 may be a heterogeneous network that includes eNBs of different types, e.g., macro eNBs, pico eNBs, femto eNBs, relay eNBs, etc. These different types of eNBs may have different transmit power levels, different coverage areas, and different impact on interference in wireless network 100. For example, macro eNBs may have a high transmit power level (e.g., 5 to 40 Watts) whereas pico eNBs, femto eNBs, and relay eNBs may have lower transmit power levels (e.g., 0.1 to 2 Watts).

A network controller 130 may couple to a set of eNBs and may provide coordination and control for these eNBs. Network controller 130 may communicate with the eNBs via a backhaul. The eNBs may also communicate with one another, e.g., directly or indirectly via a wireless or wireline backhaul.

UEs 120 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, a smart phone, a netbook, a smartbook, etc.

Figure 2:
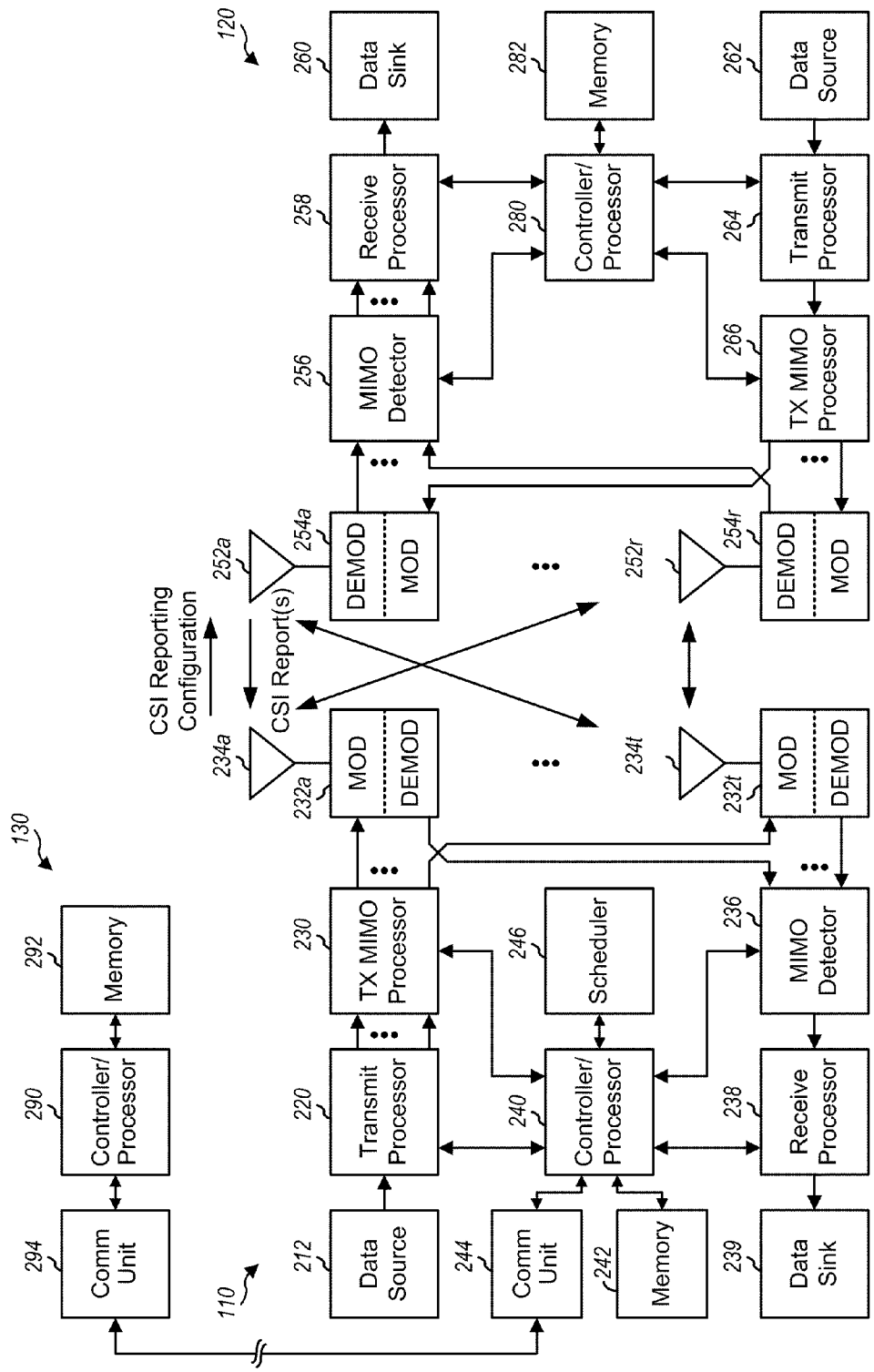
FIG. 2 shows a block diagram of a base station and a UE.

FIG. 2 shows a block diagram of a design of a base station/eNB 110 and a UE 120, which may be one of the base stations/eNBs and one of the UEs in FIG. 1. The various components (e.g., processors) shown in FIG. 2 may be utilized to perform the CSI reporting techniques described herein. As used herein, the term CSI general refers to any type of information describing characteristics of the wireless channel. As will be described in greater detail below, CSI feedback may include one or more of channel quality indication (CQI), rank indication (RI), and precoding matrix index (PMI). Thus, while certain descriptions below may refer to CQI as an example type of CSI, it should be understood that CQI is just one example of a type of CSI that may be reported in accordance to techniques discussed herein.

As illustrated, the base station 110 may transmit CSI reporting configuration information to the UE 120. As will be described in greater detail below, the UE 120 may send reports for clean CSI (for protected subframes) and unclean (for non-protected subframes) in accordance with the CSI configuration information. As will be described in greater detail below, the CSI reports may include clean and unclean CSI jointly encoded in the same report or time division multiplexed in separate reports.

Base station 110 may be equipped with T antennas 234a through 234t, and UE 120 may be equipped with R antennas 252a through 252r, where in general $T \geq 1$ and $R \geq 1$.

At base station 110, a transmit processor 220 may receive data from a data source 212 for one or more UEs and control information from a controller/processor 240. Processor 220 may process (e.g., encode and modulate) the data and control information to obtain data symbols and control symbols, respectively. Processor 220 may also generate reference symbols for synchronization signals, reference signals, etc. A transmit (TX) multiple-input multiple-output (MIMO) processor 230 may perform spatial processing (e.g., precoding) on the data symbols, the control symbols, and/or the reference symbols, if applicable, and may provide T output symbol streams to T modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110, downlink signals from other base stations, and/or P2P signals from other UEs and may provide received signals to demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information to a controller/processor 280.

On the uplink, at UE 120, a transmit processor 264 may receive data from a data source 262 and control information from controller/processor 280. Processor 264 may process (e.g., encode and modulate) the data and control information to obtain data symbols and control symbols, respectively. Processor 264 may also generate reference symbols for one or more reference signals, etc. The symbols from transmit processor 264 may be precoded by a TX MIMO processor 266 if applicable, further processed by modulators 254a through 254r (e.g., for SC-FDM, OFDM, etc.), and transmitted to base station 110, other base stations, and/or other UEs. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120 and other UEs. Processor 238 may provide the decoded data to a data sink 239 and the decoded control information to controller/processor 240.

Controllers/processors 240 and 280 may direct the operation at base station 110 and UE 120, respectively. Processor 240 and/or other processors and modules at base station 110 may perform or direct processing for the techniques described herein. Processor 280 and/or other processors and modules at UE 120 may perform or direct processing for the techniques described herein. Memories 242 and 282 may store data and program codes for base station 110 and UE 120, respectively. A communication (Comm) unit 244 may enable base station 110 to communicate with other network entities (e.g., network controller 130). A scheduler 246 may schedule UEs for data transmission on the downlink and/or uplink.

According to certain aspects, the receive processor 238 and/or controller/processor 240 may process CSI reports sent by the UE 120 and use this information to control transmissions.

FIG. 2 also shows a design of network controller 130 in FIG. 1. Within network controller 130, a controller/processor 290 may perform various functions to support communication for UEs. Controller/processor 290 may perform processing for the techniques described herein. A memory 292 may store program codes and data for network controller 130. A communication unit 294 may enable network controller 130 to communicate with other network entities.

As noted above, the BS 110 and UE 120 may utilize FDD or TDD. For FDD, the downlink and uplink may be allocated separate frequency channels, and downlink transmissions and uplink transmissions may be sent concurrently on the two frequency channels.

Figure 3:
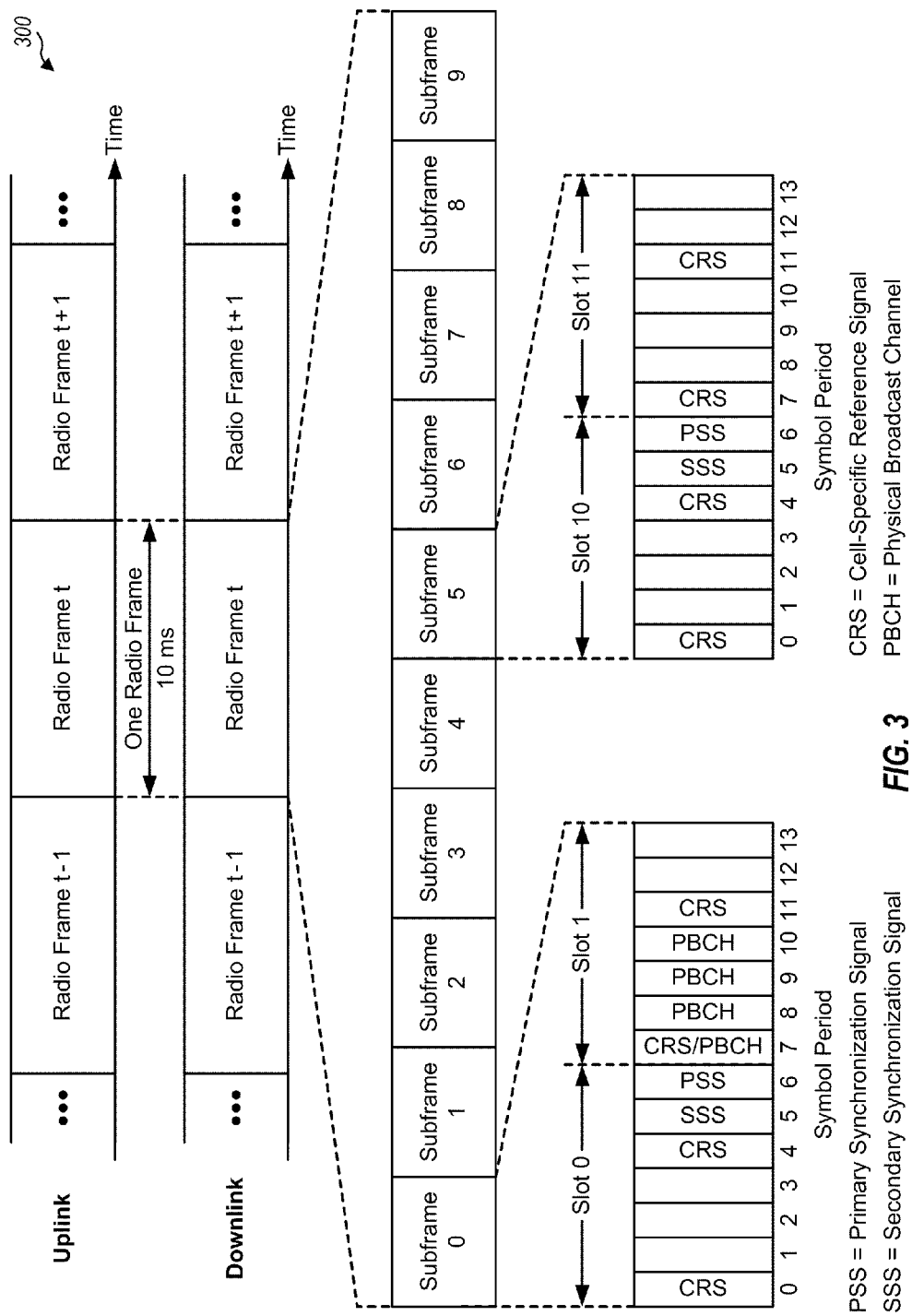
FIG. 3 shows a frame structure for frequency division duplexing (FDD).

FIG. 3 shows an exemplary frame structure 300 for FDD in LTE. The transmission timeline for each of the downlink and uplink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., seven symbol periods for a normal cyclic prefix (as shown in FIG. 2) or six symbol periods for an extended cyclic prefix. The 2L symbol periods in each subframe may be assigned indices of 0 through 2L−1.

In LTE, an eNB may transmit a primary synchronization signal (PSS) and a secondary synchronization signal (SSS) on the downlink in the center 1.08 MHz of the system bandwidth for each cell supported by the eNB. The PSS and SSS may be transmitted in symbol periods 6 and 5, respectively, in subframes 0 and 5 of each radio frame with the normal cyclic prefix, as shown in FIG. 2. The PSS and SSS may be used by UEs for cell search and acquisition. The eNB may transmit a cell-specific reference signal (CRS) across the system bandwidth for each cell supported by the eNB. The CRS may be transmitted in certain symbol periods of each subframe and may be used by the UEs to perform channel estimation, channel quality measurement, and/or other functions. The eNB may also transmit a Physical Broadcast Channel (PBCH) in symbol periods 0 to 3 in slot 1 of certain radio frames. The PBCH may carry some system information. The eNB may transmit other system information such as System Information Blocks (SIBs) on a Physical Downlink Shared Channel (PDSCH) in certain subframes.

Figure 4:
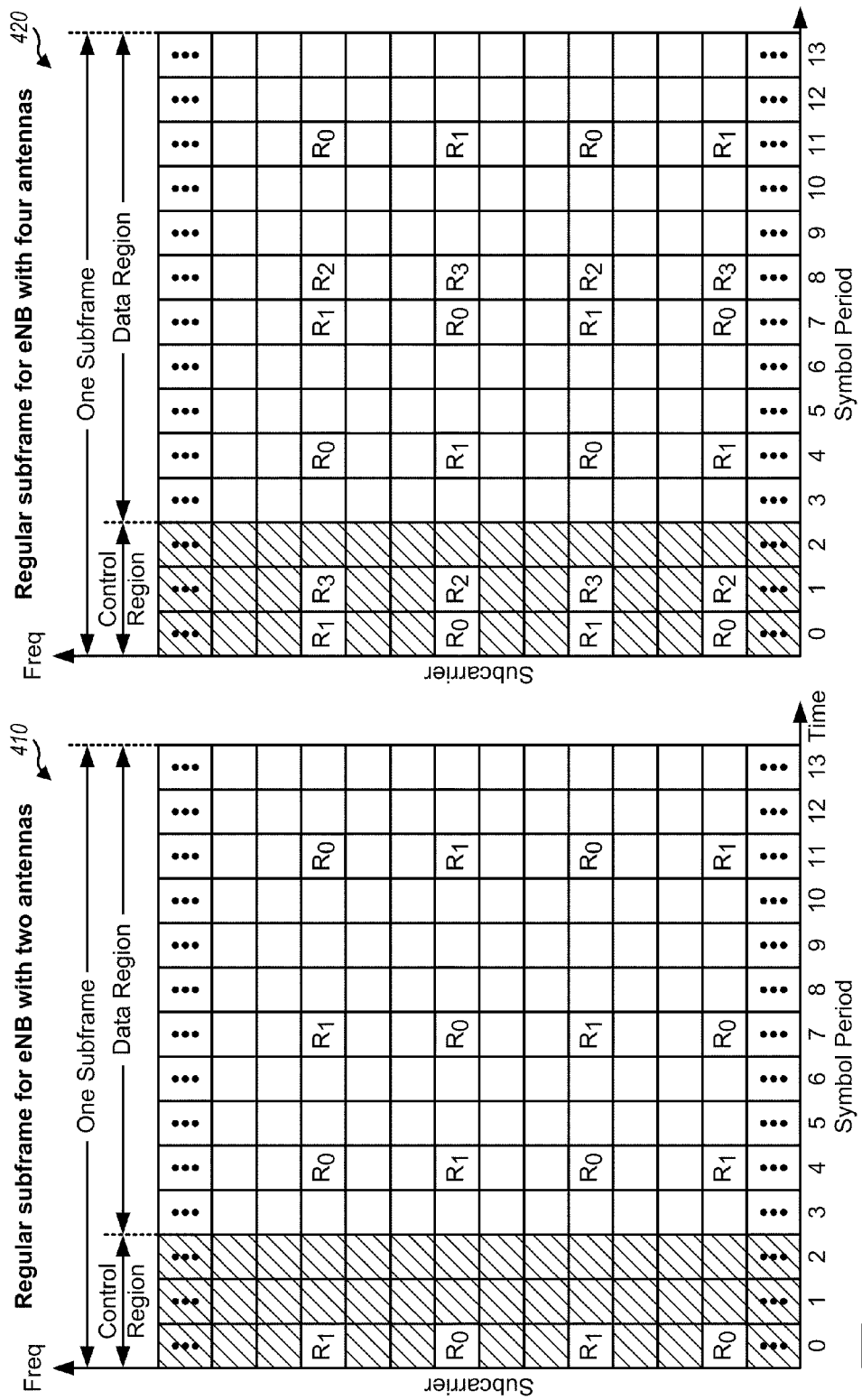
FIG. 4 shows two exemplary subframe formats for the downlink.

FIG. 4 shows two exemplary subframe formats 410 and 420 for the downlink with the normal cyclic prefix. The available time frequency resources for the downlink may be partitioned into resource blocks. Each resource block may cover 12 subcarriers in one slot and may include a number of resource elements. Each resource element may cover one subcarrier in one symbol period and may be used to send one modulation symbol, which may be a real or complex value.

Subframe format 410 may be used for an eNB equipped with two antennas. A CRS may be transmitted from antennas 0 and 1 in symbol periods 0, 4, 7 and 11. A reference signal is a signal that is known a priori by a transmitter and a receiver and may also be referred to as pilot. A CRS is a reference signal that is specific for a cell, e.g., generated based on a cell identity (ID). In FIG. 4, for a given resource element with label $R_a$, a modulation symbol may be transmitted on that resource element from antenna a, and no modulation symbols may be transmitted on that resource element from other antennas. Subframe format 420 may be used for an eNB equipped with four antennas. A CRS may be transmitted from antennas 0 and 1 in symbol periods 0, 4, 7 and 11 and from antennas 2 and 3 in symbol periods 1 and 8. For both subframe formats 410 and 420, a CRS may be transmitted on evenly spaced subcarriers, which may be determined based on the cell ID. Different eNBs may transmit their CRSs on the same or different subcarriers, depending on their cell IDs. For both subframe formats 410 and 420, resource elements not used for the CRS may be used to transmit data (e.g., traffic data, control data, and/or other data).

Figure 5:
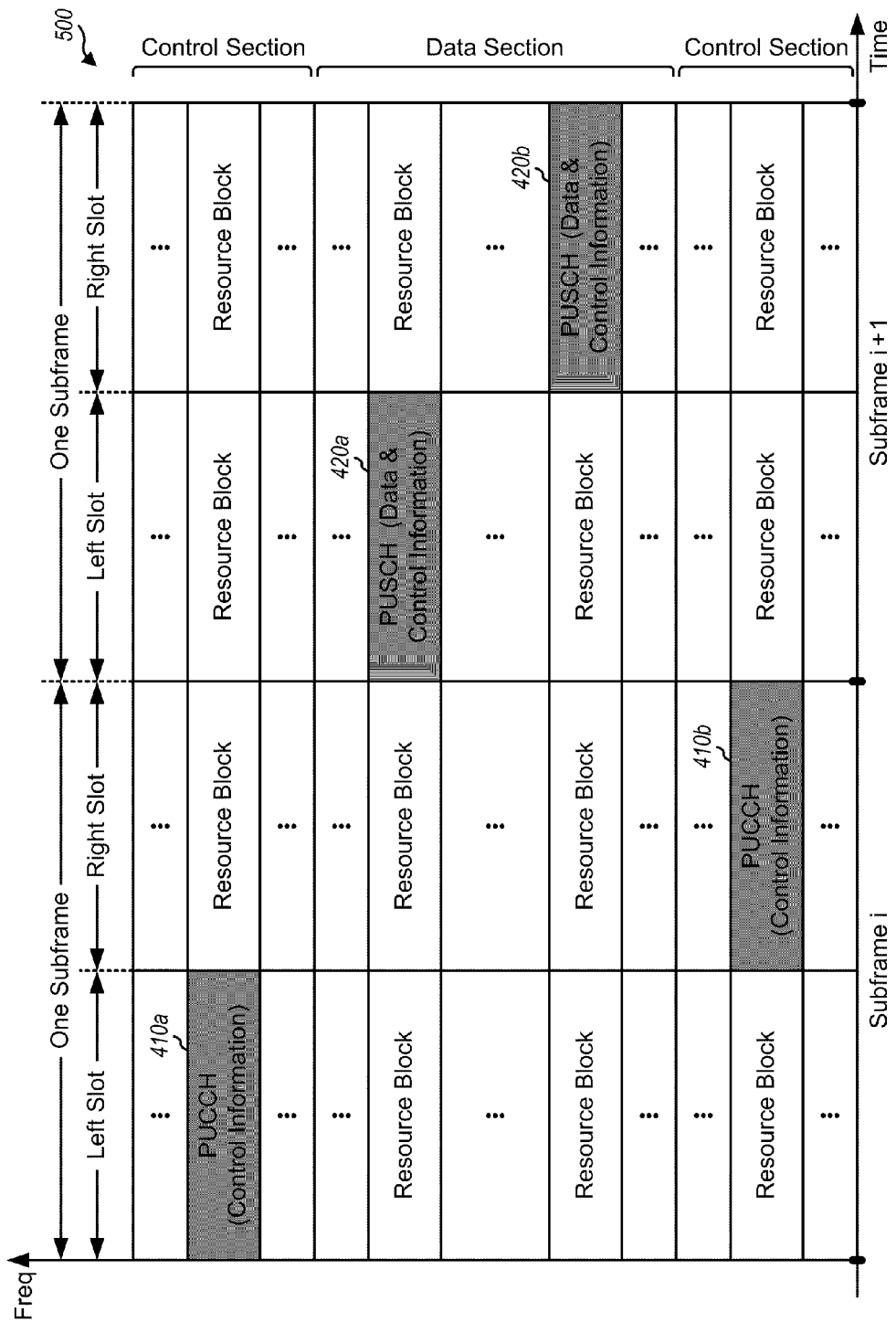
FIG. 5 shows an exemplary subframe format for the uplink.

FIG. 5 shows an exemplary format for the uplink in LTE. The available resource blocks for the uplink may be partitioned into a data section and a control section. The control section may be formed at the two edges of the system bandwidth and may have a configurable size. The resource blocks in the control section may be assigned to UEs for transmission of control information/data. The data section may include all resource blocks not included in the control section. The design in FIG. 5 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit traffic data to the Node B. The UE may transmit control information in a Physical Uplink Control Channel (PUCCH) on the assigned resource blocks in the control section. The UE may transmit only traffic data or both traffic data and control information in a Physical Uplink Shared Channel (PUSCH) on the assigned resource blocks in the data section. An uplink transmission may span both slots of a subframe and may hop across frequency, as shown in FIG. 5.

The PSS, SSS, CRS, PBCH, PUCCH and PUSCH in LTE are described in 3GPP TS 36.211, entitled "Evolved Universal Terrestrial Radio Access (E-UTRA); Physical Channels and Modulation," which is publicly available.

Various interlace structures may be used for each of the downlink and uplink for FDD in LTE. For example, Q interlaces with indices of 0 through Q−1 may be defined, where Q may be equal to 4, 6, 8, 10, or some other value. Each interlace may include subframes that are spaced apart by Q frames. In particular, an interlace q may include subframes q, q+Q, q+2Q, etc., where $q \in \{0, \ldots, Q-1\}$.

The wireless network may support hybrid automatic retransmission (HARQ) for data transmission on the downlink and uplink. For HARQ, a transmitter (e.g., an eNB) may send one or more transmissions of a packet until the packet is decoded correctly by a receiver (e.g., a UE) or some other termination condition is encountered. For synchronous HARQ, all transmissions of the packet may be sent in subframes of a single interlace. For asynchronous HARQ, each transmission of the packet may be sent in any subframe.

A UE may be located within the coverage of multiple eNBs. One of these eNBs may be selected to serve the UE. The serving eNB may be selected based on various criteria such as received signal strength, received signal quality, pathloss, etc. Received signal quality may be quantified by a signal-to-noise-and-interference ratio (SINR), or a reference signal received quality (RSRQ), or some other metric.

A UE may operate in a dominant interference scenario in which the UE may observe high interference from one or more interfering eNBs. A dominant interference scenario may occur due to restricted association. For example, in FIG. 1, UE 120c may be close to femto eNB 110c and may have high received power for eNB 110c. However, UE 120c may not be able to access femto eNB 110c due to restricted association and may then connect to macro eNB 110a with lower received power. UE 120c may then observe high interference from femto eNB 110c on the downlink and may also cause high interference to femto eNB 110c on the uplink.

A dominant interference scenario may also occur due to range extension, which is a scenario in which a UE connects to an eNB with lower pathloss and possibly lower SINR among all eNBs detected by the UE. For example, in FIG. 1, UE 120b may be located closer to pico eNB 110b than macro eNB 110a and may have lower pathloss for pico eNB 110b. However, UE 120b may have lower received power for pico eNB 110b than macro eNB 110a due to a lower transmit power level of pico eNB 110b as compared to macro eNB 110a. Nevertheless, it may be desirable for UE 120b to connect to pico eNB 110b due to the lower pathloss. This may result in less interference to the wireless network for a given data rate for UE 120b.

Communication in a dominant interference scenario may be supported by performing inter-cell interference coordination (ICIC). According to certain aspects of ICIC, resource coordination/partitioning may be performed to allocate resources to an eNB located near the vicinity of a strong interfering eNB. The interfering eNB may avoid transmitting on the allocated/protected resources, possibly except for a CRS. A UE can then communicate with the eNB on the protected resources in the presence of the interfering eNB and may observe no interference (possibly except for the CRS) from the interfering eNB.

In general, time and/or frequency resources may be allocated to eNBs via resource partitioning. According to certain aspects, the system bandwidth may be partitioned into a number of subbands, and one or more subbands may be allocated to an eNB. In another design, a set of subframes may be allocated to an eNB. In yet another design, a set of resource blocks may be allocated to an eNB. For clarity, much of the description below assumes a time division multiplex (TDM) resource partitioning design in which one or more interlaces may be allocated to an eNB. The subframes of the allocated interlace(s) may observe reduced or no interference from strong interfering eNBs.

Figure 6:
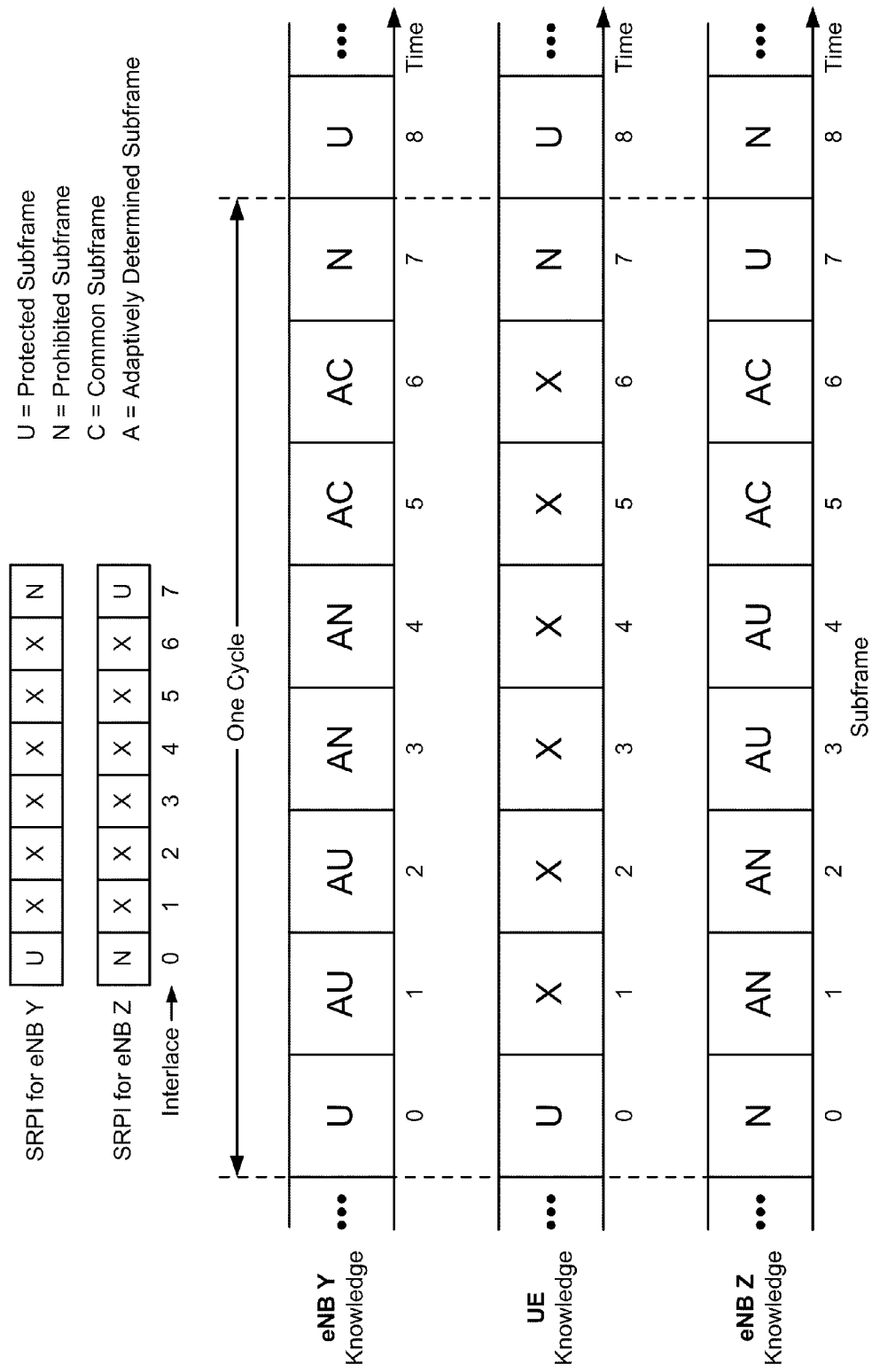
FIG. 6 shows an example partition of resources.

FIG. 6 shows an example of TDM resource partitioning to support communication in a dominant interference scenario involving eNBs Y and Z. In this example, eNB Y may be allocated interlace 0, and eNB Z may be allocated interlace 7 in a semi-static or static manner, e.g., via negotiation between the eNBs through the backhaul. eNB Y can transmit in subframes of interlace 0 and may avoid transmitting in subframes of interlace 7. Conversely, eNB Z can transmit in subframes of interlace 7 and may avoid transmitting in subframes of interlace 0. The subframes of the remaining interlaces 1 through 6 may be adaptively/dynamically allocated to eNB Y and/or eNB Z.

Table 1 lists different types of subframes in accordance with one design. From the perspective of eNB Y, an interlace allocated to eNB Y may include "protected" subframes (U subframes) that can be used by eNB Y and having little or no interference from interfering eNBs. An interlace allocated to another eNB Z may include "prohibited" subframes (N subframes) that cannot be used by eNB Y for data transmission. An interlace not allocated to any eNB may include "common" subframes (C subframes) that can be used by different eNBs. A subframe that is adaptively allocated is denoted with an "A" prefix and may be a protected subframe (AU subframe), or a prohibited subframe (AN subframe), or a common subframe (AC subframe). The different types of subframes may also be referred to by other names. For example, a protected subframe may be referred to as a reserved subframe or an allocated subframe.

TABLE 1

Subframe Types

| Subframe Type | Description | Expected CQI |
|---|---|---|
| U | Protected subframe that can be used for data transmission and having reduced or no interference from interfering eNBs. | High CQI |
| N | Prohibited subframe that cannot be used for data transmission. | Low CQI |
| C | Common subframe that can be used for data transmission by different eNBs. | High or Low CQI |

According to certain aspects, an eNB may transmit resource partitioning information (RPI) to its UEs. In some cases, RPI that changes infrequently may be referred to as static RPI (SRPI). According to certain aspects, the SRPI may comprise Q fields for the Q interlaces. The field for each interlace may be set to "U" to indicate the interlace being allocated to the eNB and including U subframes, or to "N" to indicate the interlace being allocated to another eNB and including N subframes, or to "X" to indicate the interlace being adaptively allocated to any eNB and including X subframes. A UE may receive the SRPI from the eNB and can identify U subframes and N subframes for the eNB based on the SRPI. For each interlace marked as "X" in the SRPI, the UE may not know whether the X subframes in that interlace will be AU subframes, or AN subframes, or AC subframes. The UE may know only the semi-static part of the resource partitioning via the SRPI whereas the eNB may know both the semi-static part and adaptive part of the resource partitioning.

CSI Reporting for Protected and Unprotected Resources

A UE may estimate received signal quality of an eNB based on a CRS received from the eNB. The UE may determine channel quality information (CQI), and possibly other types of CSI, based on the received signal quality and may report the CQI to the eNB. The eNB may use the CQI, for example, for link adaptation to select a modulation and coding scheme (MCS) for data transmission to the UE. Different types of subframes may have different amounts of interference and hence may have very different CQIs. In particular, protected subframes (e.g., U and AU subframes) may be characterized by better CQI since dominant interfering eNBs do not transmit in these subframes. In contrast, CQI may be much worse for other subframes (e.g., N, AN and AC subframes) in which one or more dominant interfering eNBs can transmit. From the point of view of CQI, AU subframes may be equivalent to U subframes (both are protected), and AN subframes may be equivalent to N subframes (both are prohibited). AC subframes may be characterized by a completely different CQI. To achieve good link adaptation performance, an eNB should have relatively accurate CQI for each subframe in which the eNB transmits traffic data to a UE.

According to certain aspects, a UE may determine CQI for protected subframes having reduced or no interference from interfering eNBs. CQI for a protected subframe may be referred to as "clean" CQI to emphasize that it is measured over a subframe in which dominant interfering eNBs do not transmit data. The UE may also determine at least one additional CQI for at least one unprotected subframe. An unprotected subframe may be an N subframe, an AN subframe, or an AC subframe. CQI for at least one unprotected subframe may be referred to as "unclean" CQI to emphasize that it is measured over at least one subframe in which one or more interfering eNBs may be transmitting. A combination of clean and unclean CQIs may be referred to as vectorial CQI.

Certain aspects of the present disclosure may allow periodic reporting of clean and unclean CQI, which may provide more accurate CQI information to an eNB and lead to more efficient transmissions.

Figure 7:
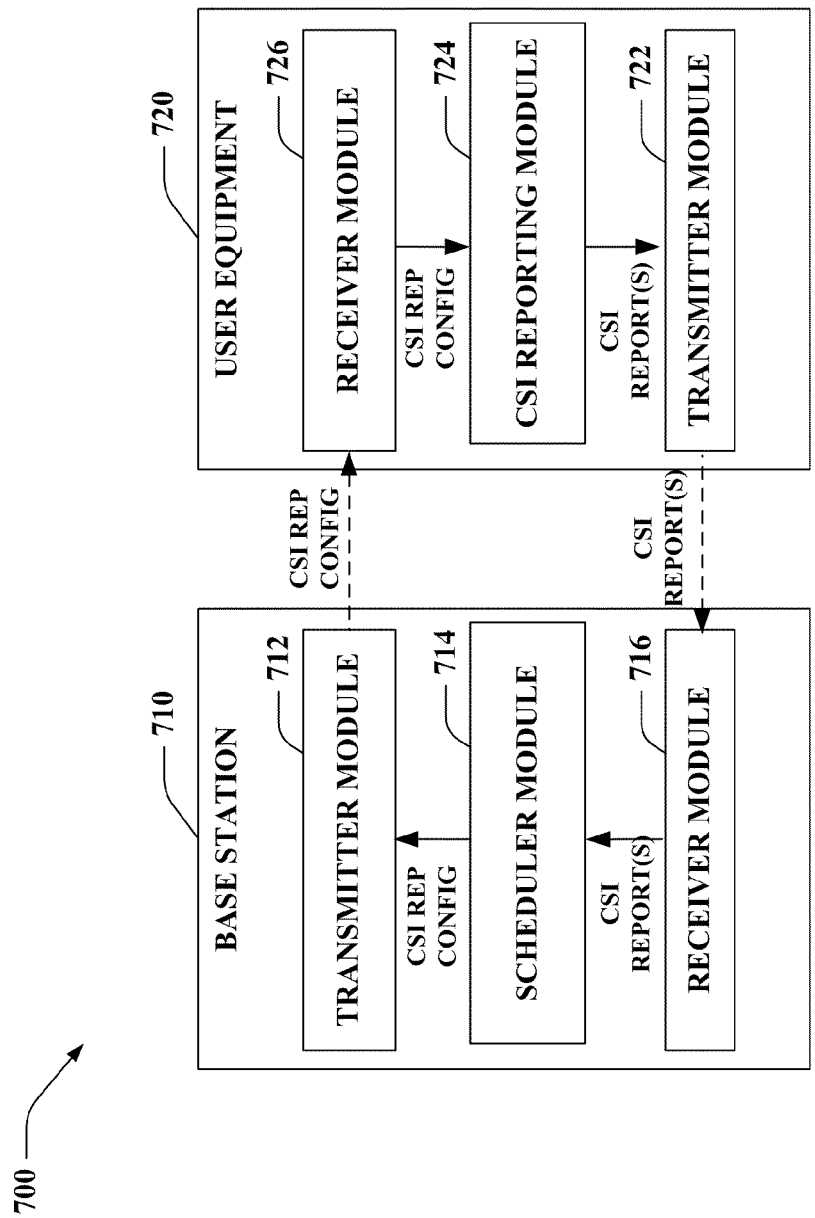
FIG. 7 shows example functional components of a base station and a UE, in accordance with certain aspects of the present disclosure.

FIG. 7 illustrates an example system 700 with a base station 710 (e.g., an eNB) and a UE 720 capable of performing periodic CQI reporting, in accordance with techniques presented herein. As illustrated, the base station 710 may include a scheduler module 714 configured to generate CQI reporting configuration information to be sent to the UE 720, via a transmitter module 712. The scheduler module 714 may also be configured to generate resource partitioning information (RPI) to be sent to the UE 720.

As illustrated, the UE 720 may include a receiver module 726 that receives the CQI reporting configuration information. The receiver module 726 may provide the CQI reporting configuration information to a CQI reporting module 524 configured to generate and transmit CQI reports for clean and unclean CQI, in accordance with the CQI reporting configuration information. The CQI reporting module 524 may also utilize resource partitioning information (RPI) received from the base station 710.

Clean/unclean CQI reports may be provided to a transmitter module 722 for transmission to the base station 710. The base station 710 may receive the reports, via a receiver module 726, and utilize the information therein for subsequent transmissions to the UE 720 (e.g., selecting one or more modulation and coding schemes). As will be described in detail below, the reports may also include information such as rank indication (RI) and precoding matrix indicator (PMI) for protected and non-protected resources.

FIG. 8 shows example operations 800 for reporting channel feedback information in accordance with aspects of the present disclosure. The operations 800 may be performed, for example, by a UE (as described below) or by some other entity.

The operations begin, at 802, by receiving resource partitioning information (RPI) indicating a set of protected resources in which transmissions in a first cell are protected by restricting transmissions in a second cell. As noted above, the protected resources may include protected subframes (e.g., U subframes). However, the protected resources may also include partitioned frequency resources (e.g., protected sets of subbands), or resource blocks (RBs).

At 804, the UE receives CSI reporting configuration information, which may convey what type of channel feedback information to report and when to report it. At 806, the UE reports "clean" CSI for the protected resources and "unclean" CSI for other resources, in accordance with the reporting configuration. As noted above, reported CSI may include CQI, RI, and/or PMI.

As will be described in greater detail below, depending on the particular implementation, a UE may jointly encode CQI for both clean and unclean resources together in the same report, may multiplex CQI for clean and unclean resources in separate reports (e.g., using TDM), or may utilize a combination of such joint encoding and multiplexing.

According to certain aspects, various types of CSI (e.g., CQI, PMI, and/or RI) of the same type (e.g., clean/unclean) may be jointly encoded and separate reports sent via TDM. The separate reports may be sent with the same periodicity (e.g., with different offsets) or with different periodicities.

FIG. 9 shows example operations 900 for receiving channel feedback information reported in accordance with aspects of the present disclosure. The operations 900 are complementary to operations 800 shown in FIG. 8 and may be performed, for example, by a base station (e.g., an eNB). The operations begin, at 902, by sending resource partitioning information (RPI) indicating a set of protected resources in which transmissions in a first cell are protected by restricting transmissions in a second cell. At 904, the base station sends CSI reporting configuration information and, at 906, the BS receives reports of "clean" CSI for the protected resources and "unclean" CSI for other resources, in accordance with the reporting configuration.

As noted above, the CSI may include CQI, RI, and PMI. For example, if MIMO is supported, then a UE may also periodically report a first RI for the resources allocated to the base station. The UE may also periodically report a second RI for the other resources. Alternatively, the second RI may be set to a fixed value (e.g., one) or to the first RI and may not be reported. The UE may also periodically report a PMI. The UE may receive data transmission sent by the base station based further on the first RI, the second RI, and/or the PMI.

Figure 10:
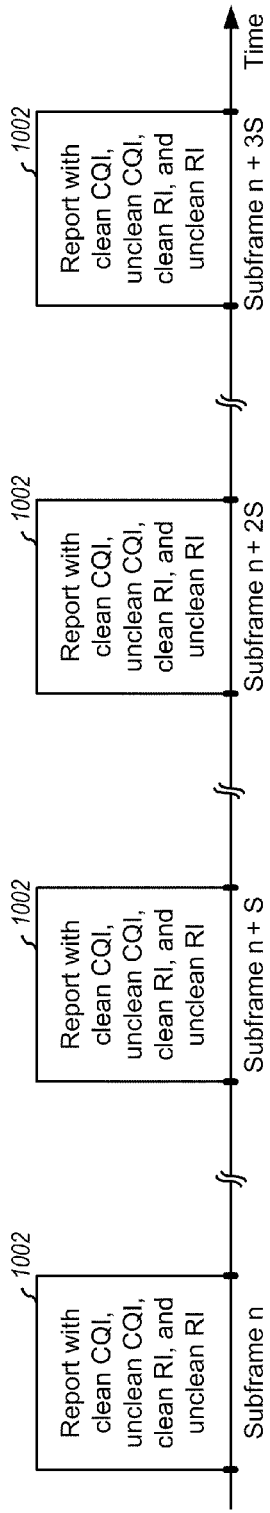
FIGS. 10-12 illustrate example schemes for periodically transmitting channel state information, in accordance with certain aspects of the present disclosure.

According to one reporting configuration, which is shown in FIG. 10, a UE may periodically generate a report 1002 comprising jointly encoded clean and unclean CQIs. If MIMO is supported, the report may also comprise clean and unclean RIs, and/or PMI. As illustrated, the UE may periodically send the report in designated subframes (with an example periodicity of S illustrated in the example of FIG. 10).

Figure 11:
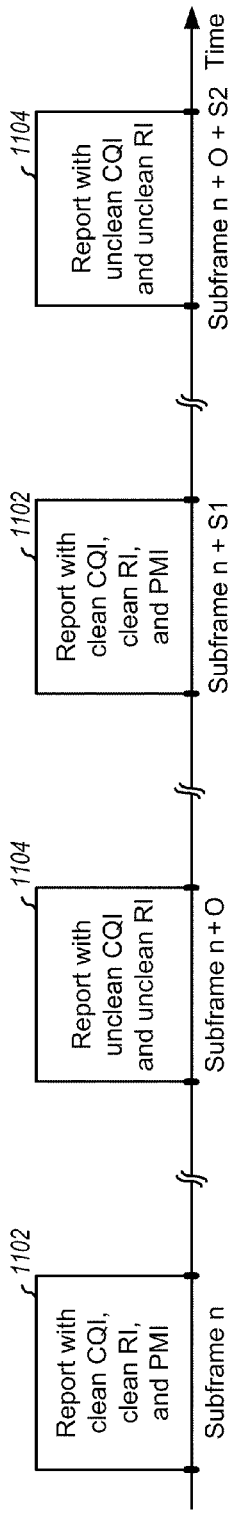

According to one reporting configuration, which is shown in FIG. 11, a UE may periodically generate a first report 1102 comprising clean CQI(s), clean RI, and possibly a PMI and may send the first report 1102 in first designated subframes. The UE may also periodically generate a second report 1104 comprising unclean CQI(s) and possibly unclean RI and may send the second report 1104 in second designated subframes. The reports 1102 and 1104 may be sent, via TDM as shown in FIG. 11, with either the same or different periodicites. In the example shown in FIG. 11, the clean CSI report 1102 is sent with a periodicity of S1, while the unclean CSI report 1104 is sent with a second periodicity of S2. According to certain aspects, the periodicities may be the same (S1=S2) and the unclean report 1104 may be sent with an offset relative to the clean report 1102 (an example offset "O" is shown in FIG. 11).

In yet another design of blocks 1016 and 1018, which is shown in FIG. 9, the UE may periodically generate a first report comprising the first and second CQIs and possibly PMI and may send the first report in first designated subframes. The UE may also periodically generate a second report comprising the first RI and possibly the second RI and may send the second report in second designated subframes. The first and second subframes may be TDMed, as shown in FIG. 9.

Figure 12:
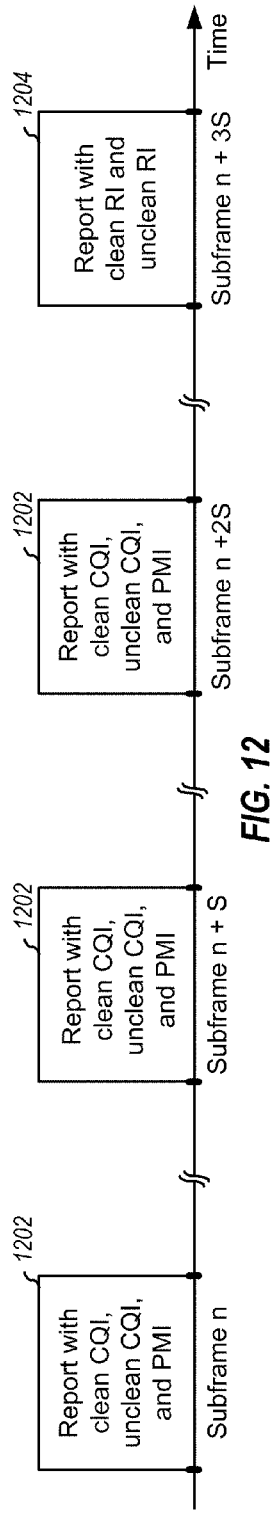

According to one reporting configuration, which is shown in FIG. 12, a UE may send a first report 1202 with clean and unclean CQIs with a first periodicity (S) and send a second report 1204 with clean and unclean RI with a second periodicity, which may be an integer of the first periodicity. For example, as shown in FIG. 12, the second report 1204 may be transmitted with a periodicity of 4S (e.g., transmitted in subframe n+3S, subframe n+7S, etc.). Thus, in this example, CQI reports may be sent every 8 or 16 ms, and RI reports may be sent every 32 or 64 ms.

According to certain aspects, a clean CSI report may comprise a single clean CQI regardless of a number of codewords for the (protected) resources allocated to the base station. An unclean CSI report may also comprise a single unclean CQI, regardless of the number of codeword for the other (non-protected) resources. In another design, clean and/or CQI for each codeword may be reported.

According to certain aspects, each clean CQI and each unclean CQI may comprise a single wideband CQI determined for the entire system bandwidth. According to certain aspects, a "per-subband" CQI may be reported for a particular subband. According to certain aspects, each clean CSI report may include per-subband CQIs while an unclean CSI report includes a single wideband CQI.

According to certain aspects, a report may also comprise a scheduling request (SR) and/or other control information. According to certain aspects, the UE may send the report on the PUCCH, e.g., when there is no traffic data to send. The UE may send the report using any one of the PUCCH report types and any one of the PUCCH formats described above.

According to certain aspects, the UE may send the report with traffic data on the PUSCH. According to certain aspects, the UE may encode a first payload comprising the first CQI(s) and/or the second CQI(s), encode a second payload comprising the first RI, and multiplex the encoded first payload, the encoded second payload, and traffic data on the PUSCH. In another design, the UE may encode a payload comprising the first CQI(s) and/or the second CQI and the first RI and may multiplex the encoded payload with traffic data on the PUSCH. In yet another design, the UE may encode a first payload comprising the first CQI(s) and/or the second CQI(s), encode a second payload comprising the first RI, encode a third payload comprising the second RI, and multiplex the encoded first payload, the encoded second payload, the encoded third payload, and traffic data on the PUSCH. The UE may also encode and multiplex the CQIs and RIs in other manners.

According to certain aspects, the protected or "clean" resources allocated to a base station may comprise a set of subframes, and all other resources (e.g., all remaining subframes) may be considered unprotected or "unclean." As noted above, the resources allocated to the base station may comprise at least one subband, or a set of resource blocks, or some other resources. The resources may be semi-statically allocated to the base station via resource partitioning for the base station and the at least one interfering base station.

The CSI reports may further comprise a scheduling request (SR) and/or other information. The base station may receive the report from the UE on the PUCCH. Alternatively, the base station may receive the report from the UE on the PUSCH.

According to certain aspects, the base station may demultiplex an encoded first payload, an encoded second payload, and traffic data from the PUSCH. The base station may then decode the encoded first payload to obtain the first CQI(s) and/or the second CQI(s) and may also decode the encoded second payload to obtain the first RI. According to certain aspects, the base station may demultiplex an encoded payload and traffic data received on the PUSCH. The base station may then decode the encoded payload to obtain CSI. In yet another design, the base station may demultiplex an encoded first payload, an encoded second payload, an encoded third payload, and traffic data from the PUSCH. The base station may decode the encoded first payload to obtain the first CQI(s) and/or the second CQI(s). The base station may also decode the encoded second payload to obtain the first RI and may decode the encoded third payload to obtain the second RI. The base station may also perform demultiplexing and decoding for channel feedback information sent on the PUSCH in other manners.

The UE may determine an unclean CQI for at least one unprotected subframe, which may be selected in various manners. According to certain aspects, an unclean CQI may be determined based on only an N subframe. According to certain aspects, an unclean CQI may be determined by averaging over a set of subframes, which may exclude U subframes. According to certain aspects, an unclean CQI may be determined by averaging over a set of subframes, which may exclude both N and U subframes.

In these cases, the set of subframes may include a fixed or configurable number of subframes. For example, the UE may send a CQI report in subframe n, and the set may include subframes n−k, for k=$k_{min}$, . . . $k_{max}$, where subframe n−k is not a U subframe (for the second design) or a U or N subframe (for the third design).

According to certain aspects, an unclean CQI may be determined by separately estimating interference in N and U subframes, determining an overall interference observed by the UE based on the estimated interference for the N and U subframes, and determining the unclean CQI based on the total interference. According to certain aspects, an unclean CQI may be determined for an unprotected subframe determined based on an offset. The offset may be with respect to a protected subframe used to determine a clean CQI or a subframe in which a report is sent. The offset may be configured by the eNB and signaled to the UE. Alternatively, the UE may cycle through a set of offsets and may select a different subframe for determining an unclean CQI in each CQI reporting period. An unclean CQI may also be determined for one or more unprotected subframes that may be selected in other manners.

As noted above, a UE may be configured to report subband CQI and/or wideband CQI. The system bandwidth may be partitioned into a number of subbands, and each subband may cover one or more resource blocks. A subband CQI may be determined for a particular subband. A wideband CQI may be determined for the entire system bandwidth.

A UE may support multiple-input multiple-output (MIMO) transmission on the downlink. For MIMO, an eNB may transmit one or more packets (or codewords) simultaneously via multiple transmit antennas at the eNB to multiple receive antennas at the UE. The UE may evaluate a MIMO channel from the eNB to the UE and may determine precoding information that can provide good MIMO transmission performance. The precoding information may include (i) a rank indicator (RI) that indicates a number of useful transmission layers for spatial multiplexing (e.g., based on the UE's estimate of the downlink channel) and/or (ii) a precoding matrix indicator (PMI) that indicates a precoding matrix to use by the eNB to precode data prior to transmission. RI may change more slowly than CQI and PMI. A number of MIMO modes may be supported. The precoding matrix may be selected and reported by the UE in some MIMO modes. The precoding matrix may be selected by the eNB (and hence not reported by the UE) in some other MIMO modes.

For MIMO, L packets may be transmitted via L layers formed with a precoding matrix, where L may be indicated by RI and may be equal to 1, 2, etc. In some MIMO modes, the L layers may observe similar SINRs, and a single CQI may be reported for all L layers. For example, a large delay cyclic delay diversity (CDD) mode in LTE may attempt to equalize SINR across all layers. In some other MIMO modes, the L layers may observe different SINRs, and one CQI may be reported for each layer. In this case, differential encoding may be used to reduce signaling overhead. With differential encoding, a CQI for a first codeword may be sent as an absolute value and may be referred to as a base CQI. Another CQI for another codeword may be sent as a relative value with respect to the base CQI and may be referred to as a differential CQI.

To support MIMO, a UE may determine and report up to L CQIs for L codewords, RI, and PMI. The UE may send CQIs, RI and PMI using various PUCCH report types defined in LTE. To support MIMO with resource partitioning, the UE may determine and report (i) up to L clean CQIs for L codewords, a clean RI, and a clean PMI for a protected subframe and (ii) up to L unclean CQIs for L codewords, an unclean RI, and an unclean PMI for at least one unprotected subframe. RI may be dependent on channel quality and may be different for protected and unprotected subframes. Hence, RI may be determined and reported separately for protected and unprotected subframes. PMI may be dependent on channel gains and may be similar for both protected and unprotected subframes. In this case, PMI may be reported with only clean CQI(s) or only unclean CQI(s). PMI may also be different in different subframes due to time-varying channels or for coordinated multi-point (CoMP) transmission such as cooperative beamforming (CBF). In this case, PMI may be reported with both clean and unclean CQIs.

A UE may be configured for periodic reporting of channel feedback information by an eNB. The channel feedback information may comprise CQI, or RI, or PMI, some other information, or a combination thereof. The reporting configuration for the UE may indicate which information to report, a particular PUCCH report type to use, a reporting interval or periodicity, etc. When TDM resource partitioning is used for the downlink (as shown in FIG. 6) and the uplink, only certain subframes may be available to the UE for transmission on the uplink. In this case, the reporting periodicity may be in integer multiple of Q subframes in order to ensure that the UE can send reports on the uplink. For example, the reporting periodicity may be 8, 16, 24, or some other multiple of 8 subframes for the exemplary resource partitioning shown in FIG. 6.

In an aspect, a UE may periodically determine and report channel feedback information for protected and unprotected subframes as indicated by its reporting configuration. Channel feedback information for a protected subframe may be referred to as clean channel feedback information. Channel feedback information for at least one unprotected subframe may be referred to as unclean channel feedback information. In each subframe in which the UE is configured to send a report, the UE may send clean and/or unclean channel feedback information either (i) on the PUCCH if traffic data is not being transmitted in the subframe or (ii) on the PUSCH along with traffic data if it is being transmitted in the subframe. The UE may send clean and/or unclean channel feedback information on the PUCCH or PUSCH in various manners.

In a first design of periodically sending clean and unclean channel feedback information on the PUCCH, the UE may determine and jointly encode clean and unclean CQIs and corresponding clean and unclean RIs and may generate a report comprising all of the information. PMI may be omitted if there is insufficient space to send PMI in the report. Alternatively, PMI may also be jointly encoded and included in the report. According to certain aspects, the UE may determine one clean CQI and one unclean CQI, regardless of the number of layers indicated by the clean RI and the unclean RI (and the corresponding number of codewords). In another design, the UE may determine one clean CQI for each layer indicated by the clean RI and one unclean CQI for each layer indicated by the unclean RI. According to certain aspects, the UE may determine clean and unclean wideband CQIs across the system bandwidth. In another design, the UE may determine clean and unclean subband CQIs for each of one or more specific subbands. The number of CQIs to report may be dependent on a tradeoff between signaling overhead and data performance. According to certain aspects, the UE may generate one clean wideband CQI and one unclean wideband CQI, regardless of the number of layers indicated by the clean RI and unclean RI. This design may reduce the amount of channel feedback information to send in the report and may be used, for example, for the large delay CDD mode.

Differential encoding may be used for an unclean CQI to reduce signaling overhead. For example, if the clean RI is equal to the unclean RI, then a differential CQI may be computed as follows:

$$\text{Differential CQI=Clean CQI-Unclean CQI.} \quad \text{Eq (1)}$$

A differential CQI may be computed based on the clean and unclean CQIs for the same codeword and may be sent with fewer bits than an unclean CQI. For example, an unclean CQI may be sent with four bits without differential encoding and may be sent with three or fewer bits with differential encoding.

According to certain aspects, a UE may be configured for periodic reporting, e.g., by an eNB via upper layer signaling. Prior to each reporting period, the UE may determine (i) at least one clean CQI for at least one codeword and a clean RI for a protected subframe, (ii) at least one unclean CQI for at least one codeword and an unclean RI for at least one unprotected subframe, and (iii) possibly PMI that may be applicable for both protected and unprotected subframes. The UE may jointly encode all of the channel feedback information and generate a report comprising the encoded channel feedback information. The UE may send the report on the PUCCH in a subframe designated for sending the report. The UE may repeat the processing in each reporting period.

As noted above with respect to FIG. 10, in each reporting period for clean channel feedback information, the UE may determine at least one clean CQI for at least one codeword, a clean RI, and possibly PMI for a protected subframe. The UE may jointly encode all of the clean channel state information and generate a clean report. The UE may send the clean report on the PUCCH in a subframe designated for sending this report. Similarly, in each reporting period for unclean channel feedback information, the UE may determine at least one unclean CQI for at least one codeword, an unclean RI, and possibly PMI for at least one unprotected subframe. The UE may jointly encode all of the unclean channel feedback information and generate an unclean report. The UE may send the unclean report on the PUCCH in a subframe designated for sending this report.

PMI may be the same for protected and unprotected subframes. In this case, PMI may be sent in only clean reports, or only unclean reports, or both clean and unclean reports. The specific reports in which to send PMI may be fixed (e.g., specified in a standard) or configured by the eNB and signaled to the UE. PMI may be different for different subframes if CoMP is used and may then be sent in both clean and unclean reports.

According to certain aspects, clean and unclean reports may have the same periodicity but different offsets (denoted as "O" in FIG. 11). In this design, the UE may send a clean report in one subframe, then an unclean report in another subframe, then a clean report in yet another subframe, etc. In another design, the clean and unclean reports may have different periodicities. For example, a clean report may be sent every $S_1$ subframes, and an unclean report may be sent every $S_2$ subframes. For both designs, the periodicity of the clean reports and the periodicity of the unclean reports (if different) may be configured by the eNB and signaled to the UE.

According to certain aspects, a UE may jointly encode clean and unclean CQIs (possibly with PMI) and generate CQI reports and may also jointly encode clean and unclean RIs and generate RI reports. The UE may send the CQI reports and RI reports in a TDM manner, as illustrated in FIG. 12.

As illustrated in FIG. 12, in each reporting period for CQI, the UE may determine at least one clean CQI for at least one codeword for a protected subframe, at least one unclean CQI for at least one codeword for at least one unprotected subframe, and possibly PMI. The UE may jointly encode the clean and unclean CQIs and possibly PMI and generate a CQI report. The UE may send the CQI report on the PUCCH in a subframe designated for sending this report. Similarly, in each reporting period for RI, the UE may determine a clean RI for a protected subframe and an unclean RI for at least one unprotected subframe. The UE may jointly encode the clean and unclean RIs and generate an RI report. The UE may send the RI report on the PUCCH in a subframe designated for sending this report.

According to certain aspects, clean RI and unclean RI may be determined independently for protected and unprotected subframes. In another design, unclean RI may be set to a fixed value (e.g., to one for no spatial multiplexing on the unprotected subframes) and may, thus, be omitted from the RI reports. According to certain aspects, unclean RI may be set equal to the clean RI and may, thus, also be omitted from the RI reports.

A CQI report may include up to L clean CQIs for L codewords, up to L unclean CQIs for L codewords, and possibly PMI. For example, the CQI report may include two clean CQIs, two unclean CQIs, and possibly PMI if the clean RI and unclean RI are both equal to two. Signaling overhead for the CQI report may be reduced in various manners. According to certain aspects, differential encoding may be performed for each unclean CQI, e.g., as shown in Eq (1) above. According to certain aspects, the unclean RI may be set to one, and one unclean CQI may be reported. According to certain aspects, a single differential CQI may be computed (e.g., based on the clean CQI and unclean CQI for the first codeword) and may be used for all L codewords. This approach may assume that a difference between clean and unclean CQIs is independent on rank. This approach may be used, for example, if unclean RI is equal to clean RI and also if the two RIs are not equal. For example, if the clean RI is equal to two and the unclean RI is equal to one, then the different CQI may be applicable for the first codeword but not for the second codeword.

According to certain aspects, the CQI and RI reports may have the same periodicity but different offsets. In this design, the UE may send a CQI report in one subframe, then an RI report in another subframe, then a CQI report in yet another subframe, etc. In another design, the CQI and RI reports may have different periodicities. For example, a CQI report may be sent every $S_1$ subframes, and an RI report may be sent every $S_2$ subframes. For both designs, the periodicity of the CQI reports and the periodicity of the RI reports (if different) may be configured by the eNB and signaled to the UE. Since RI may change more slowly than CQI, the periodicity of the RI reports may be an integer multiple of the periodicity of the CQI reports. For example, CQI reports may be sent every 8 or 16 ms, and RI reports may be sent every 80 or 160 ms.

In general, for all designs described above, the UE may determine clean CQIs for wideband and/or specific subbands and may also determine unclean CQIs for wideband and/or specific subbands. According to certain aspects, the UE may determine clean wideband CQIs and unclean wideband CQIs. In another design, the UE may determine clean subband CQIs and unclean subband CQIs. The subbands for the clean CQIs may or may not match the subbands for the unclean CQIs. In yet another design, the UE may determine clean subband CQIs and unclean wideband CQIs. The eNB may determine whether to report wideband CQI or subband CQI and may signal to the UE via upper layer signaling.

An eNB may be allocated protected subframes for the downlink as well as protected subframes for the uplink. The protected subframes for the downlink and uplink may be selected to enable efficient data transmission on the downlink and uplink with HARQ.

According to certain aspects, reporting periodicity for channel feedback information may be aligned with resource partitioning periodicity, which may be Q subframes (e.g., 8 subframes for the example shown in FIG. 6). According to certain aspects, a set of reporting periodicities may be supported and may include different integer multiples of Q subframes, e.g., 8, 16, 24, 32, 40, 48, and/or other multiples of 8 subframes. The reporting periodicity for a UE may then be selected from the supported set of reporting periodicities. This design may allow the UE to send reports on protected subframes on the uplink.

According to certain aspects, one or more techniques may be utilized to try and conserve a number of bits required to convey information. For example, LTE Release 8 defines a parameter $N_{OFFSET,CQI}$ that may be used by an eNB to signal the specific subframes in which to send reports by a UE. $N_{OFFSET,CQI}$ can have a value within a range of 0 to S−1, where S is the reporting periodicity (in number of subframes) and is configurable by the eNB. In this case, $N_{OFFSET,CQI}$ may be conveyed with $\lceil \log_2 S \rceil$ bits, where "$\lceil \ \rceil$" denotes a ceiling operator. If the UE can send reports in only protected subframes, then the possible values of $N_{OFFSET,CQI}$ would be restricted to offsets corresponding to protected subframes.

Hence, $N_{OFFSET,CQI}$ may be conveyed in fewer bits when resource partitioning is used. According to certain aspects, all protected subframes within one reporting interval may be identified and assigned indices of 0 through P−1, where P is the number of protected subframes in the reporting interval. $N_{OFFSET,CQI}$ may then indicate a specific protected subframe in which to send a report and may be conveyed with $\lceil \log_2 P \rceil$ bits. In another design, $\lceil \log_2 S \rceil$ bits may be used for $N_{OFFSET,CQI}$, as in LTE Release 8, but only $\lceil \log_2 P \rceil$ bits would be used to indicate an offset for sending reports, and the remaining $\lceil \log_2 S \rceil - \lceil \log_2 P \rceil$ bits may be used for other purposes. For example, the remaining bits may be used to specify the location or offset of a reference subframe to use for determining unclean CQI and unclean RI.

LTE Release 8 supports four PUCCH report types that may be used to send different combinations of CQI, RI and PMI. LTE Release 8 also supports different PUCCH reporting modes. PUCCH reporting modes 1-0 and 1-1 may be used to send wideband CQI. PUCCH reporting modes 2-0 and 2-1 may be used to send subband CQI for one or more bandwidth parts (BPs). The PUCCH report types and PUCCH reporting modes in LTE Release 8 are described in 3GPP TS 36.213, entitled "Evolved Universal Terrestrial Radio Access (E-UTRA); Physical layer procedures," which is publicly available.

According to certain aspects, additional PUCCH report types may be defined (e.g., in addition to those report types currently defined in LTE Release 8) to support reporting of clean and unclean channel feedback information. According to certain aspects, one or more PUCCH report types listed in Table 2 may be supported. Other PUCCH report types may also be supported for clean and unclean channel feedback information.

TABLE 2

Additional PUCCH Report Types

| PUCCH Report Type | Reported Info | Description |
| --- | --- | --- |
| 5 | Dual Subband CQIs | Similar to PUCCH report type 1, but two subband CQIs for clean and unclean CQIs are reported. Subband granularity may be different between clean and unclean CQIs. Differential encoding may be used for unclean CQI. |
| 6 | Dual Wideband CQIs/PMI | Similar to PUCCH report type 2, but two wideband CQIs for clean and unclean CQIs (and only one PMI) are reported. Differential encoding may be used for unclean CQI. |
| 7 | Dual RIs | Similar to PUCCH report type 3, but two RIs for clean and unclean RIs are reported. |
| 8 | Dual Wideband CQIs | Similar to PUCCH report type 4, but two wideband CQIs for clean and unclean CQIs are reported. Differential encoding may be used for unclean CQI. |

LTE Release 8 supports six PUCCH formats that may be used to send uplink control information (UCI). These formats are described in 3GPP TS 36.211, entitled "Evolved Universal Terrestrial Radio Access (E-UTRA); Physical Channels and Modulation," which is publicly available.

According to certain aspects, PUCCH formats 2, 2a and 2b may be used to send reports carrying clean and unclean CQIs. For example, PUCCH format 2 may be used for a CQI/PMI report, or an RI report, or a dual CQI/PMI report, or a dual RI report when not multiplexed with ACK/NACK feedback for HARQ. PUCCH format 2a may be used for a CQI/PMI report, or an RI report, or a dual CQI/PMI report, or a dual RI report when multiplexed with 1-bit ACK/NACK feedback for the normal cyclic prefix. PUCCH format 2b may be used for a CQI/PMI report, or an RI report, or a dual CQI/PMI report, or a dual RI report when multiplexed with 2-bit ACK/NACK feedback for the normal cyclic prefix. PUCCH format 2 may also be used for a CQI/PMI report, or an RI report, or a dual CQI/PMI report, or a dual RI report when multiplexed with ACK/NACK feedback for the extended cyclic prefix.

A UE may send a scheduling request (SR) when the UE has traffic data to send on the uplink. An eNB may receive the scheduling request, schedule the UE for data transmission on the uplink, and send an uplink grant to the UE. The UE may then send traffic data on the uplink in accordance with the uplink grant. The UE may send the scheduling request in a protected subframe for the uplink in order to ensure that the scheduling request can be reliably received by the eNB.

According to certain aspects, a UE may need to send both a report and a scheduling request in the same protected subframe. This may occur more frequently when a limited number of protected subframes are available to the UE with resource partitioning. According to certain aspects, the UE may send the scheduling request and may drop the report when a collision occurs. According to certain aspects, the UE may send the scheduling request along with channel feedback information in the report. One or more new PUCCH report types and one or more new PUCCH formats may be defined to support concurrent transmission of scheduling request and channel feedback information. For example, PUCCH format type 5a may be similar to PUCCH format 5 in Table but may include an additional bit to indicate whether or not a scheduling request is being sent. Similarly, PUCCH formats 3, 3a and 3b may be similar to PUCCH formats 2, 2a and 2b, respectively, but may allow multiplexing of scheduling request with other information.

In yet another aspect, a UE may send traffic data and UCI comprising clean and unclean channel feedback information on the PUSCH. The UE may send either the PUCCH or PUSCH in any given subframe. The UE may multiplex UCI with traffic data when the PUSCH is transmitted. The coding of UCI and the multiplexing of UCI with traffic data may be performed in various manners.

According to certain aspects, when sending clean and unclean channel feedback information on the PUSCH, the UE may encode a CQI/PMI payload and an ACK/NACK payload (if any) as described in LTE Release 8. The UE may encode an RI payload comprising clean RI and unclean RI based on a suitable coding scheme. According to certain aspects, a single parity bit may be computed as the sum (modulo 2) of all bits of the RI payload. In another design, two parity bits may be computed for a 3-bit RI payload and three parity bits may be computed for a 4-bit RI payload by considering any two or three different linear independent combinations of bits. All bits in the RI payload may be considered in the computation of at least one parity bit. New parity bits for the RI payload may also be computed in other manners. In any case, the UE may multiplex the encoded CQI/PMI payload, the encoded ACK/NACK payload, and the encoded RI payload with traffic data on the PUSCH.

According to certain aspects, when sending clean and unclean channel feedback information on the PUSCH, the UE may form a CQI/PMI/RI payload comprising clean and unclean CQIs, PMI, and clean and unclean RIs. The UE may then encode the CQI/PMI/RI payload using the coding scheme used for a CQI/PMI payload or a new coding scheme. The UE may then multiplex the encoded CQI/PMI/RI payload and an encoded ACK/NACK payload (if any) with traffic data on the PUSCH.

According to certain aspects, when sending clean and unclean channel feedback information on the PUSCH, the UE may separately encode a CQI/PMI payload, a clean RI payload, and an unclean RI payload. The UE may separately encode the clean RI payload and the unclean RI payload based on the coding scheme for an RI payload in LTE Release 8. The UE may then multiplex the encoded CQI/PMI payload, the encoded clean RI payload, and the encoded unclean RI with traffic data on the PUSCH. According to certain aspects, the RI payloads may be concatenated and the concatenated payload may be encoded.

Clean and unclean CSI may also be encoded, multiplexed, and sent on the PUSCH in any other suitable manners.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
receiving resource partitioning information (RPI) indicating at least a first set of resources by a user equipment, the first set of resources comprising a first set of subframes assigned to a first cell that are protected by restricting transmissions on the first set of subframes by a second cell;
periodically reporting channel state information (CSI) for the first set of resources;
periodically reporting CSI for a second set of resources; and
receiving configuration information indicating when to report the CSI for the first and second sets of resources;
wherein the CSI for the first and second sets of resources comprises a channel quality indicator (CQI) reported with a first periodicity and a rank indicator (RI) reported with a second periodicity.

2. The method of claim 1, wherein the first set of resources further comprises at least one of a subband or a set or resource blocks (RBs).

3. The method of claim 1, wherein the CSI for the first and second sets of resources are sent using time division multiplexing (TDM).

4. The method of claim 3, wherein the configuration information comprises:
at least a first period for reporting CSI for the first set of resources.

5. The method of claim 4, wherein the configuration information comprises:
at least a second period for reporting CSI for the second set of resources.

6. The method of claim 4, wherein the configuration information comprises:
an offset for reporting CSI for the second set of resources within the first period.

7. The method of claim 1, wherein CQIs for the first and second sets of resources are reported in separate reports sent using time division multiplexing (TDM).

8. The method of claim 1, wherein the CSI for at least one of the first and second sets of resources further comprises multiple CQIs dependent on a number of layers indicated by the RI.

9. The method of claim 1, wherein the CSI for at least one of the first and second sets of resources further comprises a wideband CQI determined for a range of system bandwidth.

10. The method of claim 1, wherein the CSI for at least one of the first and second sets of resources further comprises one or more subband CQIs, each subband CQI determined for a particular subband.

11. The method of claim 10, wherein:
the CSI for the first set of resources further comprises one or more subband CQIs, each determined for a particular subband; and
the CSI for the second set of resources further comprises a wideband CQI determined for a range of system bandwidth.

12. The method of claim 1, wherein:
the CSI for at least one of the first and second sets of resources further comprises a precoder matrix index (PMI).

13. The method of claim 1, further comprising:
transmitting a scheduling request using resources in which transmissions in a first cell are protected by restricting transmissions in a second cell.

14. The method of claim 13, wherein:
the scheduling request is transmitted with CSI reported for at least one of the first and second sets of resources.

15. The method of claim 1, wherein:
the CSI for at least one of the first and second sets of resources is sent on a physical uplink control channel (PUCCH).

16. The method of claim 1, wherein:
the CSI for at least one of the first and second sets of resources is sent with traffic data on a physical uplink shared channel (PUSCH).

17. The method of claim 1, wherein the RI payload is multiplexed with traffic data and other encoded control information on the PUSCH.

18. A method for wireless communication, comprising:
transmitting resource partitioning information (RPI) by a base station, wherein the RPI indicates at least a first set of resources, the first set of resources comprising a first set of subframes allocated to a first cell and protected by restricting transmissions in a second cell;
receiving periodically reported channel state information (CSI) for the first set of resources;
receiving periodically reported CSI for a second set of resources; and
transmitting configuration information indicating when to report the CSI for the first and second sets of resources;
wherein the CSI for the first and second sets of resources comprises a channel quality indicator (CQI) reported with a first periodicity and rank indicator (RI) reported with a second periodicity.

19. The method of claim 18, wherein the first set of resources further comprises at least one of a subband or a set or resource blocks (RBs).

20. The method of claim 18, wherein the CSI for the first and second sets of resources are sent using time division multiplexing (TDM).

21. The method of claim 20, wherein the configuration information comprises:
at least a first period for reporting CSI for the first set of resources.

22. The method of claim 21, wherein the configuration information comprises:
at least a second period for reporting CSI for the second set of resources.

23. The method of claim 21, wherein the configuration information comprises:
an offset for reporting CSI for the second set of resources within the first period.

24. The method of claim 20, wherein:
the CSI for at least one of the first and second sets of resources further comprises a precoding matrix index (PMI).

25. An apparatus for wireless communication, comprising:
means for receiving resource partitioning information (RPI) indicating at least a first set of resources, the first set of resources comprising a first set of subframes assigned to a first cell that are protected by restricting transmissions on the first set of subframes by a second cell;
means for periodically reporting channel state information (CSI) for the first set of resources;
means for periodically reporting CSI for a second set of resources; and
means for receiving configuration information indicating when to report the CSI for the first and second sets of resources;
wherein the CSI for the first and second sets of resources comprises a channel quality indicator (CQI) reported with a first periodicity and rank indicator (RI) reported with a second periodicity.

26. The apparatus of claim 25, wherein the first set of resources further comprises at least one of a subband or a set or resource blocks (RBs).

27. The apparatus of claim 25, wherein the CSI for the first and second sets of resources are sent using time division multiplexing (TDM).

28. The apparatus of claim 25, wherein the configuration information comprises:
at least a first period for reporting CSI for the first set of resources.

29. The apparatus of claim 28, wherein the configuration information comprises:
at least a second period for reporting CSI for the second set of resources.

30. The apparatus of claim 28, wherein the configuration information comprises:
an offset for reporting CSI for the second set of resources within the first period.

31. An apparatus for wireless communication, comprising:
means for transmitting resource partitioning information (RPI) indicating at least a first set of resources, the first set of resources comprising a first set of subframes assigned to a first cell that are protected by restricting transmission on the first set of subframes by a second cell;
means for receiving periodically reported channel state information (CSI) for the first set of resources;
means for receiving periodically reported CSI for a second set of resources; and
means for transmitting configuration information indicating when to report the CSI for the first and second sets of resources;
wherein the CSI for the first and second sets of resources comprises a channel quality indicator (CQI) reported with a first periodicity and rank indicator (RI) reported with a second periodicity.

32. The apparatus of claim 31, wherein the first set of resources further comprises at least one of a subband or a set or resource blocks (RBs).

33. The apparatus of claim 31, wherein the CSI for the first and second sets of resources are sent using time division multiplexing (TDM).

34. The apparatus of claim 33, wherein the configuration information comprises:
at least a first period for reporting CSI for the first set of resources.

35. The apparatus of claim 34, wherein the configuration information comprises:
at least a second period for reporting CSI for the second set of resources.

36. The apparatus of claim 34, wherein the configuration information comprises:
an offset for reporting CSI for the second set of resources within the first period.

37. An apparatus comprising:
at least one processor configured to receive resource partitioning information (RPI) indicating at least a first set of resources, the first set of resources comprising a first set of subframes assigned to a first cell that are protected by restricting transmissions on the first set of subframes by a second cell, periodically report channel state information (CSI) for the first set of resources, periodically report CSI for a second set of resources, and receive configuration information indicating when to report the CSI for the first and second sets of resources, wherein the CSI for the first and second sets of resources comprises a channel quality indicator (CQI) reported with a first periodicity and rank indicator (RI) reported with a second periodicity; and
a memory coupled with the at least one processor.

38. An apparatus comprising:
at least one processor configured to transmit resource partitioning information (RPI) indicating at least a first set of resources, the first set of resources comprising a first set of subframes assigned to a first cell that are protected by restricting transmissions on the first set of subframes by a second cell, receive periodically reported channel state information (CSI) for the first set of resources, receive periodically reported CSI for a second set of resources, and transmit configuration information indicating when to report the CSI for the first and second sets of resources, wherein the CSI for the first and second sets of resources comprises a channel quality indicator (CQI) reported with a first periodicity and rank indicator (RI) reported with a second periodicity; and
a memory coupled with the at least one processor.

39. A non-transitory computer readable medium with instructions stored thereon, the instructions executable by one or more processors for:
receiving resource partitioning information (RPI) indicating at least a first set of resources by a user equipment, the first set of resources comprising a first set of subframes assigned to a first cell that are protected by restricting transmissions on the first set of subframes by a second cell;
periodically reporting channel state information (CSI) for the first set of resources;

periodically reporting CSI for a second set of resources, and receiving configuration information indicating when to report the CSI for the first and second sets of resources;

wherein the CSI for the first and second sets of resources comprises a channel quality indicator (CQI) reported with a first periodicity and rank indicator (RI) reported with a second periodicity.

40. A non-transitory computer readable medium with instructions stored thereon, the instructions executable by one or more processors for:

transmitting resource partitioning information (RPI) indicating at least a first set of resources by a base station, the first set of resources comprising a first set of subframes assigned to a first cell that are protected by restricting transmissions on the first set of subframes by a second cell;

receiving periodically reported channel state information (CSI) for the first set of resources;

receiving periodically reported CSI for a second set of resources; and transmitting configuration information indicating when to report the CSI for the first and second sets of resources;

wherein the CSI for the first and second sets of resources comprises a channel quality indicator (CQI) reported with a first periodicity and rank indicator (RI) reported with a second periodicity.

* * * * *